(12) United States Patent
Godavarthy et al.

(10) Patent No.: US 12,015,739 B2
(45) Date of Patent: Jun. 18, 2024

(54) INTEGRATED CUSTOMER INFORMATION USER INTERFACE

(71) Applicant: ServiceNow, Inc., Santa Clara, CA (US)

(72) Inventors: Umakanth Godavarthy, Hyderabad (IN); Pavan Reddy Thokala, Hyderabad (IN); Sri Mahathi Nalluri, Guntur (IN); Jeevan Swarna, Narsaraopet (IN); Denzil Joseph, Mountain View, CA (US); Cameron Garrett Wheeler, Mountain House, CA (US)

(73) Assignee: ServiceNow, Inc., Santa Clara, CA (US)

( * ) Notice: Subject to any disclaimer, the term of this patent is extended or adjusted under 35 U.S.C. 154(b) by 624 days.

(21) Appl. No.: 17/020,606

(22) Filed: Sep. 14, 2020

(65) Prior Publication Data

US 2022/0086280 A1 Mar. 17, 2022

(51) Int. Cl.
| | | |
|---|---|---|
| *H04M 3/00* | (2006.01) | |
| *G06F 3/0482* | (2013.01) | |
| *H04L 51/02* | (2022.01) | |
| *H04L 67/75* | (2022.01) | |
| *H04M 1/72436* | (2021.01) | |
| *H04M 3/22* | (2006.01) | |
| *H04M 3/51* | (2006.01) | |

(52) U.S. Cl.
CPC ........ *H04M 3/5191* (2013.01); *G06F 3/0482* (2013.01); *H04L 51/02* (2013.01); *H04L 67/75* (2022.05); *H04M 1/72436* (2021.01); *H04M 3/2218* (2013.01)

(58) Field of Classification Search
CPC .......... H04M 3/5191; H04M 1/72436; H04M 3/2218; H04L 67/75; H04L 51/02; G06F 3/0482
See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |

(Continued)

*Primary Examiner* — Rasha S Al Aubaidi
(74) *Attorney, Agent, or Firm* — FLETCHER YODER PC

(57) ABSTRACT

Methods and systems for providing a centralized customer graphical user interface (GUI) include receiving an indication that a user has initiated an interaction with a cloud platform for support. In response, an interaction record is created for the interaction. A context is also determined for the interaction. The GUI displays information based on the context. An indication that an ending of the interaction has occurred may cause the GUI to present a wrap-up with confirmation indicators for one or more records interacted with via the GUI. The GUI may also receive an indication that one or more of the confirmation indicators is correct, and in response to receiving the indication that the one or more of the confirmation indicators is correct, one or more corresponding records are edited.

20 Claims, 29 Drawing Sheets

(56) References Cited

U.S. PATENT DOCUMENTS

| | | |
|---|---|---|
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Meuller |
| 8,887,133 B2 | 11/2014 | Behnia |
| 9,098,322 B2 | 8/2015 | Apte |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,818,729 B1 | 11/2017 | Moon |
| 10,958,786 B1 * | 3/2021 | Nilsen ............... H04M 3/42042 |
| 2017/0230191 A1 * | 8/2017 | Cuzzort .................. H04L 43/16 |

* cited by examiner

INTEGRATED CUSTOMER INFORMATION USER INTERFACE

BACKGROUND

The present disclosure relates generally to an integrated customer information user interface that combines data from multiple sources in a single user interface to provide robust support to customers.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations strive to provide robust support to customers. However, the organizations may provide multiple different avenues for customers to seek assistance. For instance, customers may access knowledge articles online, access a frequently asked questions (FAQ) page, send text messages, send email messages, send in-browser chat messages, call a call center, and the like. Due to the potentially vast amount of different communication channels between the customer and the organization, the customer may have to present information and share what steps the customer has already pursued each time the customer uses a different channel type. Furthermore, each of these communications may consume valuable time for the customer and/or agent(s) of the organization to ascertain the issue and/or steps to be performed to resolve the issue each time a communication is initiated between the customer and the agent(s). Furthermore, the agent(s) may be required to access multiple different data sources and/or related pages to understand the context of the contact from the customer.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed below, a graphical user interface (GUI) may provide a centralized customer interface that provides a holistic view about a customer's activities or interactions with a platform. Using the centralized customer interface, agents may be empowered with up-to-date customer activities and/or information at their fingertips with data from multiple sources to offer a superior customer interaction. The centralized customer interface offers flexible configuration options and powerful visualizations to enable service agents of organizations to tailor the customer interface to fit their business needs. Customer service units of organizations can select the appropriate information to serve up to agents that can help agents quickly identify the intent of the customer, get to the transaction in question, and take actions to resolve the issue in a shorter amount of time than possible if the agent had to resort to acquiring such information from the customer directly. For example, the centralized customer interface may present different information sets in different contexts. The context indicates what time of information is to be displayed to the agent based on a type of call. The contexts may include a contact context, an account context, or a consumer context. Each of the different contexts cause the customer interface to display different information or present information differently. For instance, when a customer calls and a contact context is opened, contact information frames may be displayed. When an account context is used, account information may be displayed in the centralized customer interface. When a consumer context is used, consumer information may be displayed in the centralized customer interface. Furthermore, using the information, the customer interface may enable the agents to reduce handling time, drive agent empathy for the customer based on previous issues/actions/waits that the customer has experienced, improve first-contact resolution percentages, and the like.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
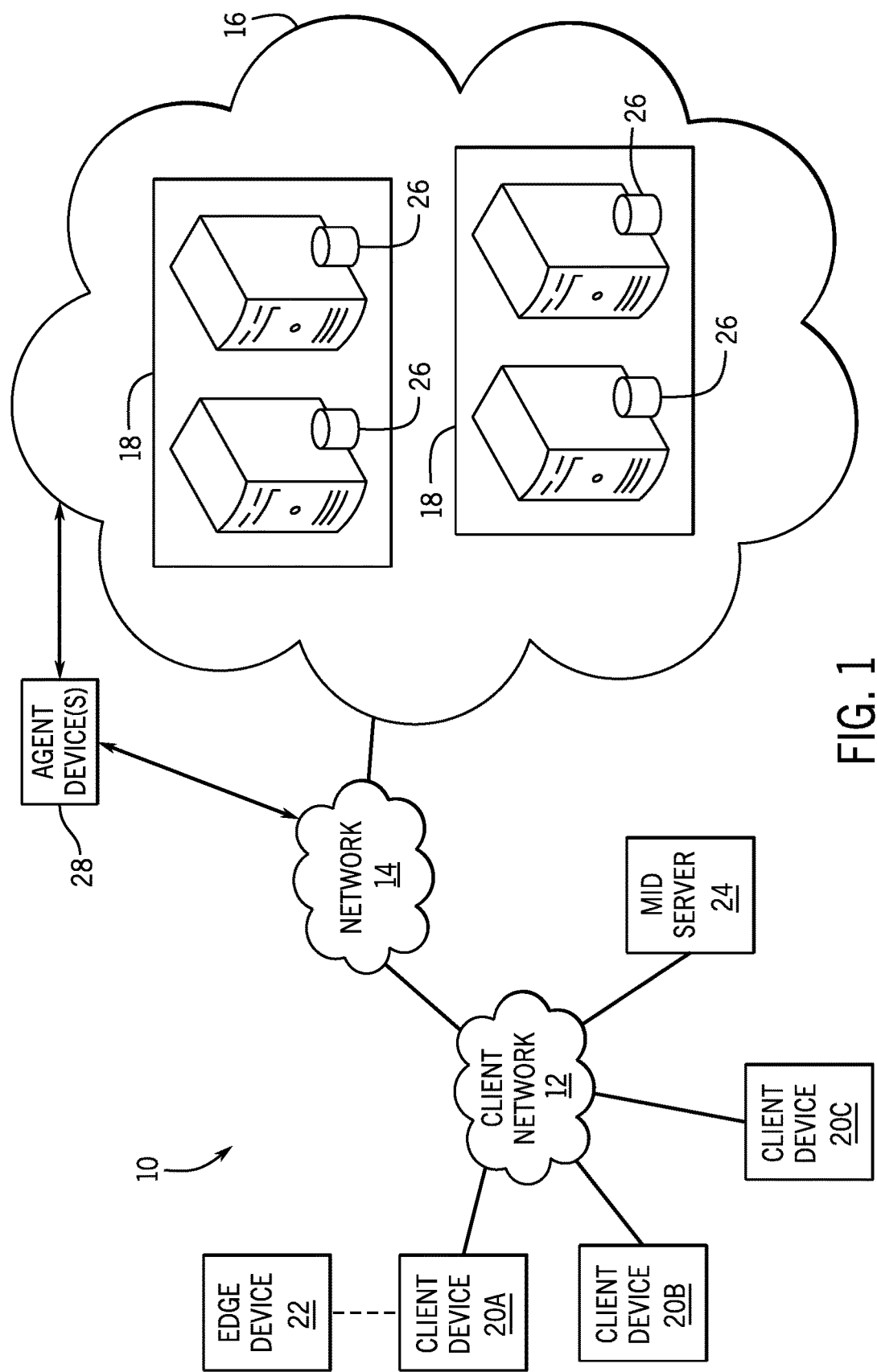
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed below, a graphical user interface (GUI) may provide a centralized customer interface that provides information about a customer. Organizations that provide customer service and/or support can benefit from the customer interface. Using the customer interface, agents of such organizations may be empowered with up-to-date customer information at their fingertips with data from multiple sources to offer a superior customer interaction. One of the biggest challenges organizations face today is to build a complete view of their customers and the customers' devices. The customer interface offers flexible configuration options and powerful visualizations to enable organizations to tailor the customer interface to fit their business needs. Organizations can select the appropriate information to serve up to agents that can help agents quickly identify the intent of the customer, get to the transaction in question, and take actions to resolve the issue in a shorter amount of time than possible if the agent had to resort to acquiring such information from the customer directly. Furthermore, using the information, the customer interface may enable the agents to reduce handling time, drive empathy for the agent based on previous issues/actions/waits that the customer has experienced, improve first-contact resolution percentages, generally improve the customer experience the call, improving agent efficiency and accuracy of reporting the interaction, and the like.

With the preceding in mind, the following figures relate to various types of generalized system architectures or configurations that may be employed to help provide services and/or support to customers of an organization in a framework (e.g., a multi-instance framework) and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14 to provide cloud services to the client devices 20 from the platform 16.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 may include multiple of servers 26. The servers 26 may include virtual servers (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may configure the data centers 18 using a variety of computing infrastructures. Furthermore, customers using the client network 12 and/or the platform 16 may require assistance for particular actions (e.g., device and/or application installations), for applications, and/or for services used by the customer. To provide such support, one or more agent device(s) 28 may provide an agent with information about the customer, the customer's actions, devices/applications/services in the network 12 the platform 16, and the like. As discussed below, an integrated customer information interface may provide intuitive information about the customer, the customer's actions, devices/applications/services in the network 12 the platform 16, and the like to enable the agent to provide efficient assistance to the customer. To enable the agent to provide such support, the agent device(s) 28 may interface with the client network 12 and/or the platform 16 via the network 14. Additionally or alternatively, the agent device(s) 28 may have a direct connection to the platform 16. In some embodiments, at least some of the agent device(s) 28 may be located within the platform 16 and/or within the client network 12.

In some embodiments, one or more of the data centers 18 are configured using a multi-tenant cloud architecture, such that one of the instances of the servers 26 handles requests from and serves multiple customers. In certain embodiments, a single agent and/or agent device 28 may provide support for the multiple customers. Data centers 18 with multi-tenant cloud architecture comingle and store data from multiple customers, where multiple customer instances are assigned to one of the servers 26. In a multi-tenant cloud architecture, a particular server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual servers 26 and/or other combinations of physical and/or virtual servers, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
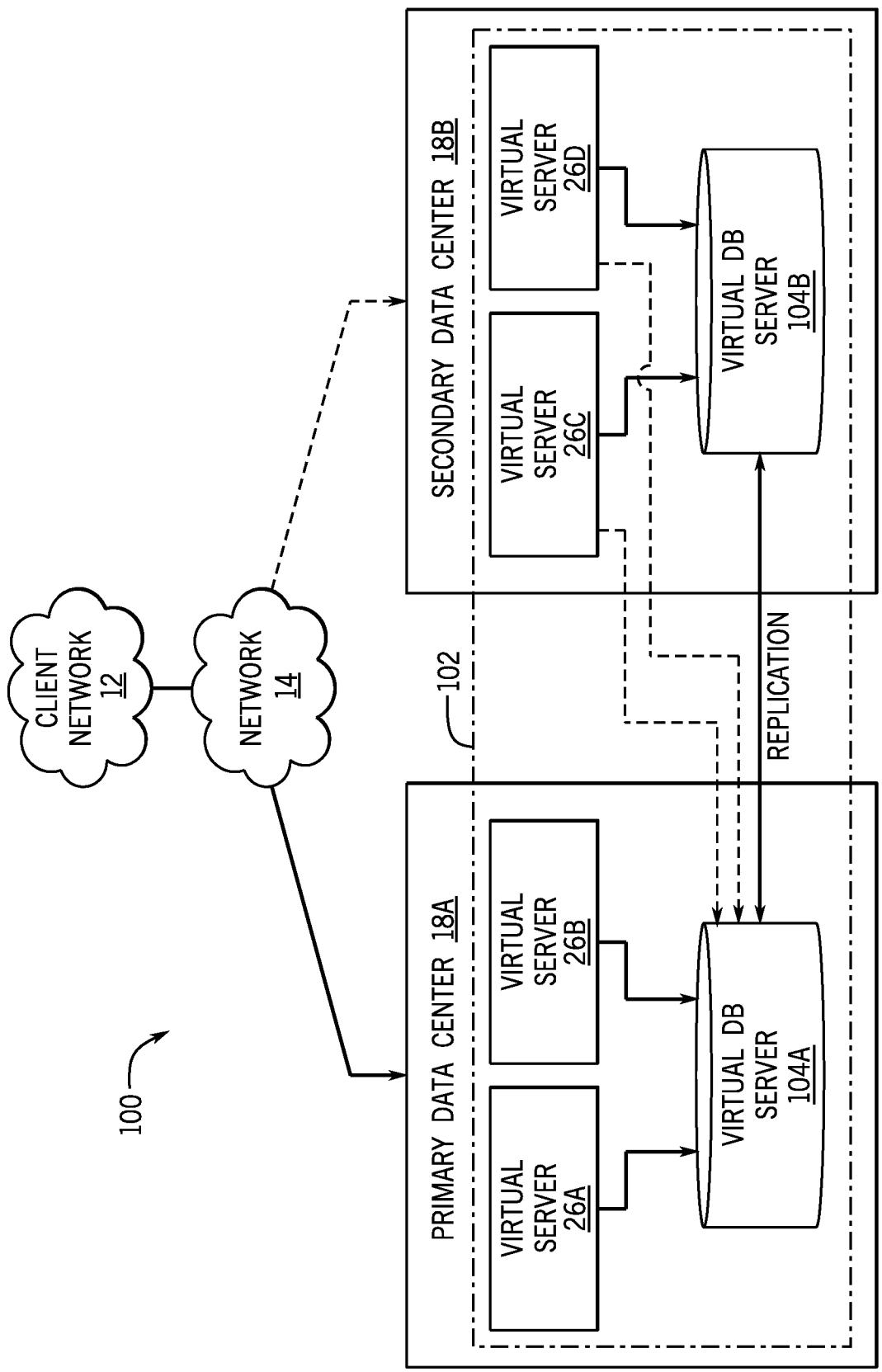
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated servers (e.g., servers 26A, 26B, 26C, and 26D) and dedicated database servers (e.g., database servers 104A and 104B). Stated another way, the servers 26A-26D and database servers 104A and 104B are not shared with other client instances and are specific to the respective client instance 102. In the depicted example, to facilitate availability of the client instance 102, the servers 26A-26D and database servers 104A and 104B are allocated to two different data centers 18A and 18B so that one of the data centers 18 may act as a backup data center. Other embodiments of the multi-instance cloud architecture 100 may include other types of dedicated servers, such as a web server. For example, the client instance 102 may be associated with (e.g., supported and enabled by) the dedicated servers 26A-26D, dedicated database servers 104A and 104B, and additional dedicated web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different servers into a single server or, conversely, perform operations attributed to a single server using multiple servers. For instance, using FIG. 2 as an example, the servers 26A, 26B, 26C, 26D and database servers 104A, 104B may be combined into a single server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
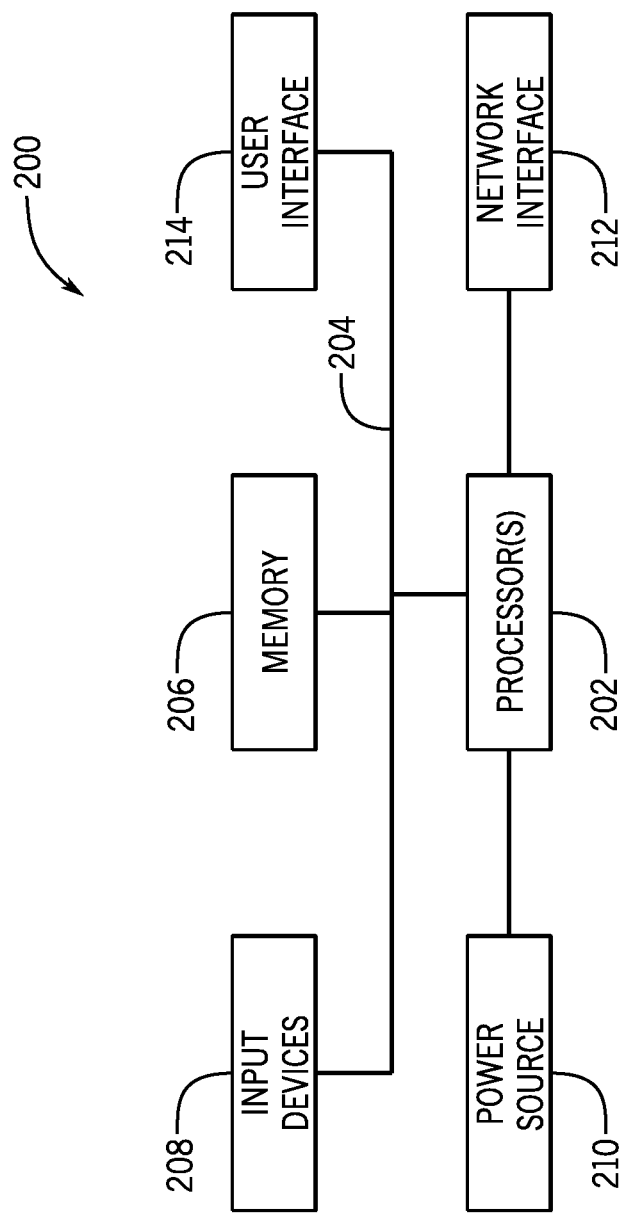
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the components depicted in FIG. 3. FIG. 3 generally illustrates a block diagram of example components of a computing system 200 and their potential interconnections or communication paths, such as along one or more buses. As illustrated, the computing system 200 may include various hardware components such as, but not limited to, one or more processors 202, one or more buses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more buses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
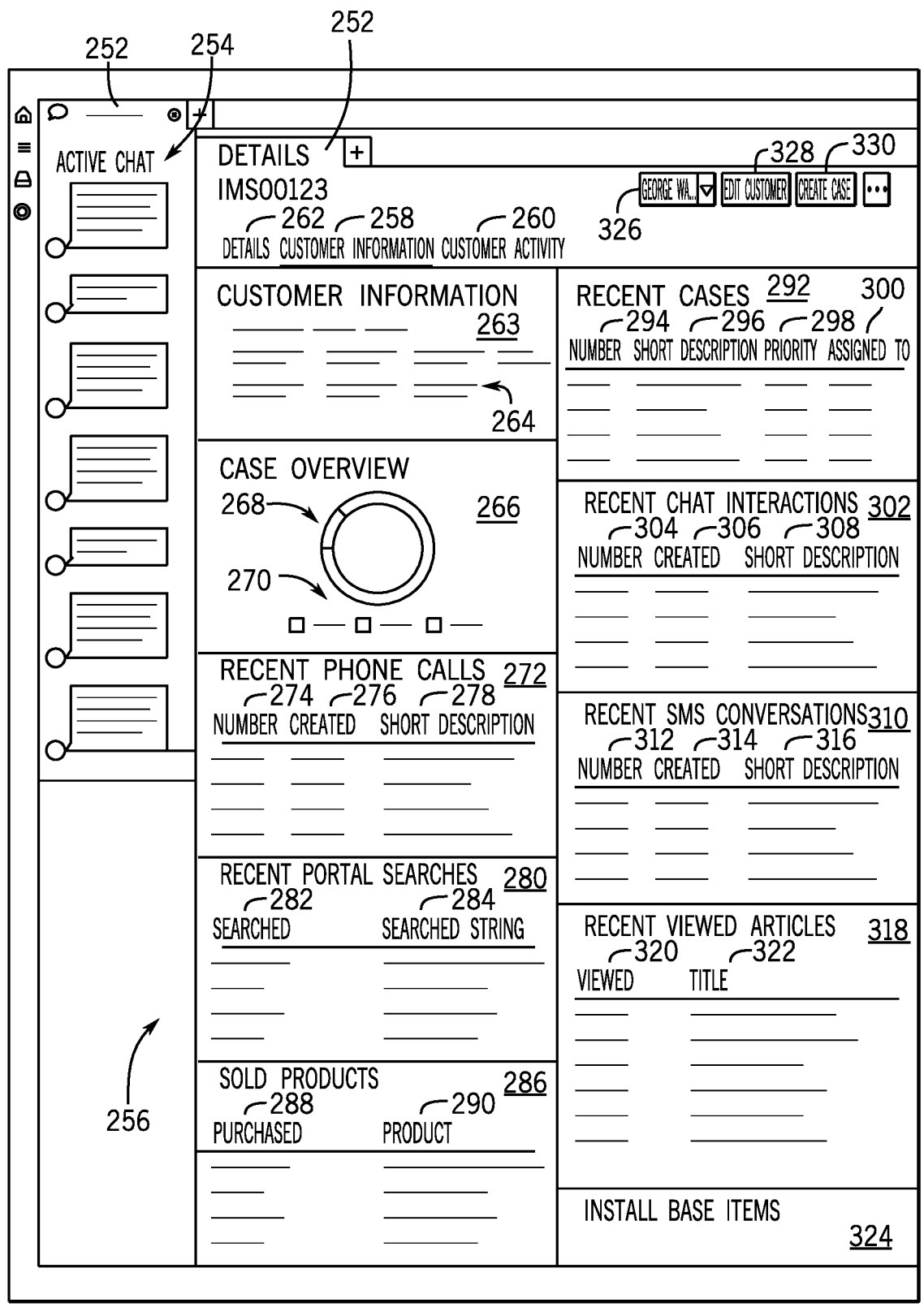
FIG. 4 is a graphical user interface (GUI) used to display a customer information page with a contact/account/consumer context in an agent portal in the multi-instance cloud architecture, in accordance with aspects of the present disclosure.

As may be appreciated, the computing system 200 may be used to present a graphical user interface (GUI) via the user interface 214. For instance, FIG. 4 illustrates a GUI 250 that may be presented using the user interface 214. The GUI 250 enables agents, via the agent device(s) 28, to look at recent interactions, open cases, and the like to assist the agent in identifying and resolving issues for which a customer may be calling, chatting, or texting the agent. Once the agent receives a call, chat, SMS, or other interaction, an interaction record may be created. The GUI 250 may include an interaction indicator 252 that identifies the interaction record. The ongoing communication may displayed in a chat frame 254. The chat frame 254 may contain communications between the customer and the agent. Additionally or alternatively, the chat frame 254 may contain chat information from the customer to others, such as other agents and/or virtual assistants.

The GUI 250 also includes a customer information tab 258, a customer activity tab 260, and a details tab 262. The GUI 250 displays corresponding information in a details frame 256 based on the selection of the customer information tab 258, the customer activity tab 260, or the details tab 262. For instance, as illustrated, the details frame 256 displays customer information about the customer in sub-frames based on a selection of the customer information tab 258. Alternatively, if the customer activity tab 260 is selected, the GUI 250 may display customer activity information in the details frame 256. Alternatively, if the details tab 260 is selected, the GUI 250 may display details about the current interaction and/or the interaction record for the current interaction.

The customer information displayed in the details frame 256 may include a customer information sub-frame 263. The customer information sub-frame 263 may display multiple items 264 reflecting information about the customer. For example, the items 264 may include a name, a photo, one or more contact numbers, an account type, an email address, a physical address, a start time for the current interaction, an indication of previous actions (e.g., "escalated") that may have been taken by the customer, and/or other information about the customer contacting the agent. In some embodiments, one or more of the items 264 may be selectable in the customer information sub-frame 262. For instance, selecting the item 264 corresponding to the name may bring up information for the person corresponding to the name. Similarly, selecting the items 264 corresponding the address or contact numbers may bring up other customer accounts tied to those items 264.

A cases overview sub-frame 266 may display a number of cases for the particular customer, contact, or account. For instance, the cases overview sub-frame 266 may include a circle graph 268 that displays what percentage of support cases for the customer are deemed as new, in progress, or closed support cases. Additionally or alternatively, the cases overview sub-frame 266 may include alternative mechanisms for showing new, in progress, or closed cases. For instance, text representations 270 may be used to show how many new cases have been created, how many cases are in progress, and how many cases have been closed.

The details frame 256 may also include a recent phone interactions sub-frame 272 that may be used to list phone calls along with indicators 274 of interaction records for the calls, date and times 276 of the calls, and a short description 278 of the calls. In some embodiments, the indicators 274 may be selected to open a detail view of the respective interaction record (e.g., in a new frame or tab). This list may have an agent-configurable limit on the number of calls displayed. Additionally or alternatively, the list may list calls over an agent-configurable period of time (e.g., 30 days).

The details frame 256 may also include a recent portal searches sub-frame 280 that displays portal searches executed by the customer to provide a context for interaction without requiring explicit discussion by the customer. The portal searches may be tracked to the customer using the customer's login to the portal before performing the search and stored in a respective database. The portal searches sub-frame 280 may display a date and time 282 of the portal searches. The portal searches sub-frame 280 may display strings 284 that are used in the portal searches. This list may have an agent-configurable limit on the number of portal searches displayed. Additionally or alternatively, the list may list portal searches over an agent-configurable period of time (e.g., 30 days).

The details frame 256 may also include a sold products sub-frame 286 that shows products that have been purchased by the customer. For instance, a list of sold products includes a purchase date 288 of the purchases along with a product name 290. In some embodiments, the product name 290 may include a hyperlink to a product record that opens in a new sub-tab to provide additional details about the product. This list may have an agent-configurable limit on the number of products displayed. Additionally or alternatively, the list may list products purchased over an agent-configurable period of time (e.g., 30 days).

The details frame 256 may also include a recent cases sub-frame 292 that shows open cases that may have the customer as the contact on the cases. For instance, a list of recent cases includes a case number 294 of the cases, a short description 296 of each case, a priority 298 of each case, and an assigned agent 300 to the respective cases. Fewer or more items may be configured to be displayed based on desired configurations/deployments. This list may have an agent-configurable limit on the number of recent cases displayed. Additionally or alternatively, the list may list recent cases over an agent-configurable period of time (e.g., 30 days). Additionally or alternatively, the list may be filtered and/or sorted by priority and/or severity. In some embodiments, the case number 294 may be selected to open a detailed case view of the case (e.g., in a new tab).

The details frame 256 may also include a recent chat interactions sub-frame 302 that may be used to list previous chats with indicators 304 of interaction records for the chats, date and times 306 of the chats, and a short description 308 of the chats. In some embodiments, the indicators 304 may be selected to open a detail view of the respective interaction record (e.g., in a new frame or tab). This list may have an agent-configurable limit on the number of chats displayed. Additionally or alternatively, the list may list chats over an agent-configurable period of time (e.g., 30 days).

The details frame 256 may also include a recent SMS interactions sub-frame 310 that may be used to list previous SMS communications (e.g., text messages or text-message based strings (i.e., "text message" conversations or chats) with indicators 312 of interaction records for the chats, date and times 314 of the chats, and a short description 316 of the chats. In some embodiments, the indicators 312 may be selected to open a detail view of the respective interaction record (e.g., in a new frame or tab). This list may have an agent-configurable limit on the number of chats displayed. Additionally or alternatively, the list may list chats over an agent-configurable period of time (e.g., 30 days).

The details frame 256 may also include a recently viewed article sub-frame 318 that displays recent knowledge articles viewed by the customer to provide a context for interaction without requiring explicit discussion by the customer. The knowledge articles may be tracked to the customer using the customer's login to read the respective knowledge articles that are stored in a respective database. The recently viewed article sub-frame 318 may display a date and time 320 a knowledge article was searched for and/or accessed. The recently viewed article sub-frame 318 may display titles 322 of the recently viewed knowledge articles and/or key words or short descriptors from which the subject matter of a respective knowledge article may be determined. This list may have an agent-configurable limit on the number of knowledge articles displayed. Additionally or alternatively, the list may list knowledge articles viewed over an agent-configurable period of time (e.g., 30 days).

The details frame 256 may also include an installed base items sub-frame 324 that displays base items on which the sold products are installed or services related to sold products. The installed base items sub-frame 324 may include links to the base item records. The base items may be stored in a configuration management database (CMDB) that is accessed by the agent device.

The details frame 256 may also include a contracts sub-frame that displays all the contracts that were bought in the last agent-configurable number (e.g., 30) of days. The list may include a contract number, a date of purchase for the contract, a date on which the contract ends, and/or other information about the contract. The information displayed in the contracts sub-frame may be configured to display specific information for different businesses. In some embodiments, the contract number in the list may be selectable to open up the respective contract record (e.g., in a new sub-tab).

The details frame 256 may also include an entitlements sub-frame to list entitlements available for the customer, account, or contact. This list displays the entitlements bought within an agent-configurable number (e.g., 30) of days. The list may also detail when the entitlements were purchased, a name for the entitlements, end dates for the entitlements, and the like. The parameters/fields displayed in the list may be configured to specific businesses and/or configurations. In some embodiments, selecting a part of a listed item (e.g., a name) may open up the respective entitlement record (e.g., in a new sub-tab).

The GUI 250 may also include other buttons for one or more actions. For example, the GUI 250 may include a view as button 326 that enables the agent to switch contexts from customer information to account information or other contacts. In some embodiments, this switching may be restricted to business-to-business (e.g., where the customer is a business) scenarios and suppressed for business-to-consumer. In other words, the view as button 326 enables the agent to change a view of the data that is displayed in the GUI 250. For example, in a business-to-business scenario, the agent may switch between view types to be able to view information about which the contact may be calling. For example, a first contact (e.g., George Warren) calls in, but wants to get an update on a second contact (e.g., Julie Lewis's case), since the second contact is out on vacation, but both are listed as contacts on a customer account. When the first contact calls, the GUI 250 displays all information that is associated to first contact. To view the second contact's case, the agent may switch the view from the first contact to the second contact. Accordingly, the view as button 326 may present a drop-down list. The drop-down list may list an account for a contact, may list all contacts for an account, or other related record types. For instance, returning to the previous example, when the agent opens up the drop down, the agent may select the second contact from the list. A refresh of the GUI 250 refreshes information displayed to information related to the second contact.

As another example, if a contact is calling to get information about a contract, the contract may be associated with an account rather than a contact. Thus, the contracts may be viewed by switching from the contact's view to a main account view. Refreshing after selecting the main account view, the GUI 250 may display all transactions for all contacts of that account, display all contracts associated to that account, and all entitlements associated to that account.

The GUI 250 may also include an edit customer button 327 that enables the agent to edit contact/account/consumer information based at least in part on the context of the GUI 250. The edit customer button 327 may be dynamic based on a context of the contact/account/consumer page. If the view pertains to a customer contact, the edit customer button 327 may indicate that the contact will be edited upon selection of the edit customer button 327. Similarly, if the view pertains to an account, the edit customer button 327 may indicate that the account information will be edited upon selection of the edit customer button 327. If the view pertains to a consumer, the edit customer button 327 may indicate that the consumer will be edited upon selection of the edit customer button 327. Regardless of context, the edit customer button 327 may cause an edit sub-frame/sub-tab to be opened to edit the contact/account/consumer information. A create case button 330 may be used to create a new case based on the interaction and associated with one or more records based on the context of the GUI 250.

When the customer activity tab 260 is selected, the details frame 256 may be used to display customer activity information. In some embodiments, when the customer activity tab 260 is selected, the customer information sub-frame 263 and the cases overview sub-frame 266 may be suppressed with the remaining information displayed differently than how it is displayed in the customer information frame illustrated in FIG. 4. Using the customer activity tab 260, the GUI 250 may display touch points that the customer has had with the service operation of the organization displayed in a timeline view in reverse chronological order. This information may be the same data that is displayed using the customer information tab 258, but in a different visualization with a different agent interaction that prioritizes recency.

Figure 5:
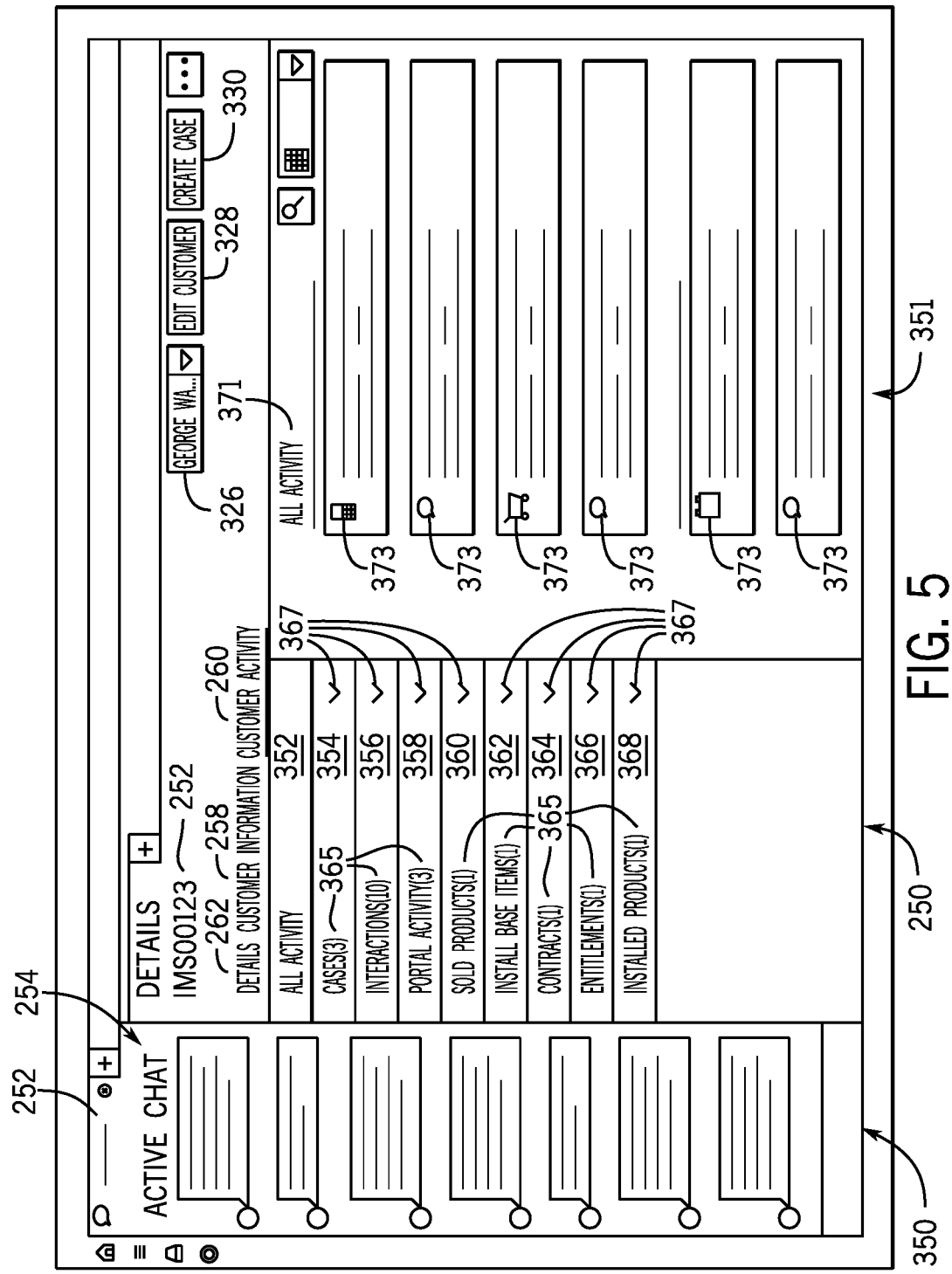
FIG. 5 is a graphical user interface (GUI) used to display a customer activity page with a contact/account/consumer context in an agent portal in the multi-instance cloud architecture, with the GUI having a details frame and multiple facets, in accordance with aspects of the present disclosure.

In response to the selection of the customer activity tab 260, the GUI 250 displays a split panel view of the data. In a first portion (e.g., the left-hand side) of the details frame 256, the GUI 250 provides facets of information that may be selected to filter or choose what information about the customers' activities is to be displayed. In a second portion of the details frame 256 (e.g., the right-hand side), the GUI 250 portrays information that corresponds to or is otherwise determined based on which facet is selected in the first portion. For example, as illustrated in FIG. 5, a page 350 may include selectable facets that change what information is displayed in a facet sub-frame 351. The information displayed in the facet sub-frame 351 may be configurable by the agent and/or the customer. Similarly, the facets that enable selection may be configurable, edited, and/or ordered by the agent and/or the customer.

As previously discussed, the page 350 has multiple facets. For instance, the illustrated page 350 includes an all-activity facet 352, a cases facet 354, an interactions facet 356, a portal activity facet 358, a sold products facet 360, an installed base item facet 362, a contracts facet 364, an entitlements facet 366, and an installed products facet 368. More or fewer facets may be included in various embodiments.

For example, some embodiments may include an escalation facet that is used to show an escalation record when one is associated with a case record associated with the customer (or other context). For instance, the escalation information may include an escalation record creation date, a severity of the escalation/problem, a state of the escalation/problem, a reason or justification for the escalation, a trend for the escalation/problem, an authorization for the escalation/problem, and/or other information related to the escalation/problem.

Additionally or alternatively, a community interaction facet may be included to enable the agent to view interactions that the customer (or another context) has had with a community page. For instance, the facet may be selected to show which posts have been viewed by the customer including a date, a question posed in the post, question details, resolution details, and/or other information related to the viewed post. The facet may also show posts/questions posed by the customer. For instance, the facet may be used to view a date when the question was posted, the question, question details, resolution details, and/or other information related to the question posed by the customer.

In some embodiments, each facet may include an indicator 365 that indicates how many records are displayable via the respective facet. For instance, the indicator 365 may include a number corresponding to the number of items (e.g., cases, etc.) that have been created or changed within a configurable period of time (e.g., 30 days). Additionally or alternatively, each facet may include an indicator 367 that indicates that sub-facets are selectable within the respective facet. For instance, when the indicator 367 is selected for a respective facet, the facet may be expanded to show corresponding, selectable sub-facets. In some embodiments, the indicators 365 and/or 367 may be respectfully omitted from the page 350 when a corresponding sub-facet has no corresponding items or has no sub-facets. In some embodiments, the all-activity facet 352 may be selected by default upon selection of the customer activity tab 260. Alternatively, as a default, no facet may be selected with no information presented in the facet sub-frame 351 until a facet is selected in the page 350. Regardless, the illustrated facet sub-frame 351 is displaying all activity based on selection of the all-activity facet 352 or upon a default setting. A title 371 in the facet sub-frame 351 may change to reflect which facet is selected in the page 350. Furthermore, each entry in the facet sub-frame 351 may include an icon 373 to indicate what type of record corresponds to the entry.

Figure 6:
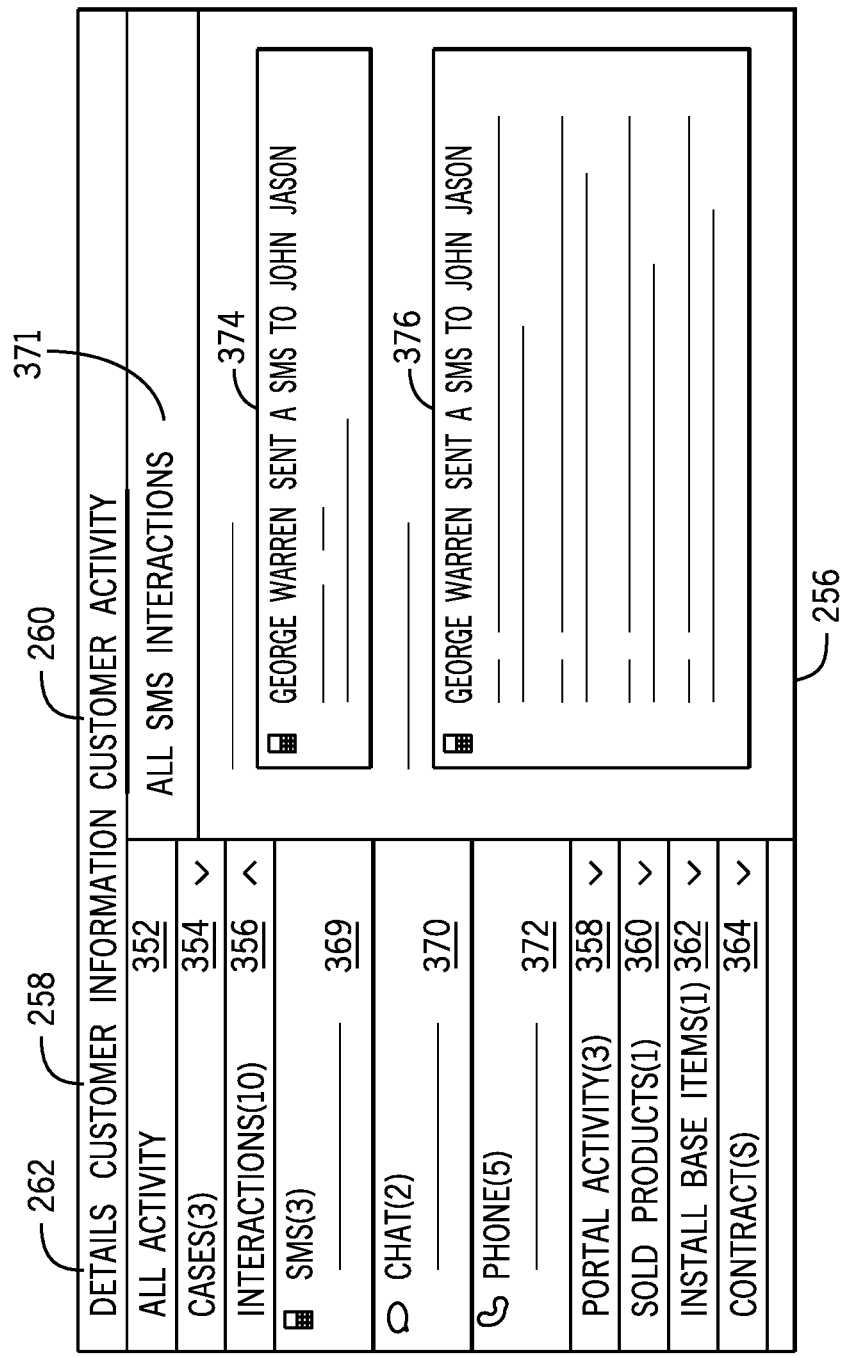
FIG. 6 is a portion of the GUI of FIG. 5 with an SMS facet selected, in accordance with aspects of the present disclosure.

FIG. 6 represents an embodiment of the details frame 256 when the interactions facet 356 is selected and/or expanded. Based on the selection/expansion, the details frame 256 is used to display an SMS facet 369, a chat facet 370, and a phone facet 372. In FIG. 6, the SMS facet 369 is selected as indicated by the highlight of the SMS facet 369. Accordingly, SMS logs 374 and 376 are displayed in the details frame 256. As illustrated, the SMS logs 374 and 376 may be displayed in a reverse chronological order with texts from a single session grouped together to ease tracking the conversation. In some embodiments, the SMS logs 374 and 376 may be limited to SMS chats that have ended. The SMS logs 374 and 376 may include dates, interaction record numbers, transcripts of the interaction, and the like.

Figure 7:
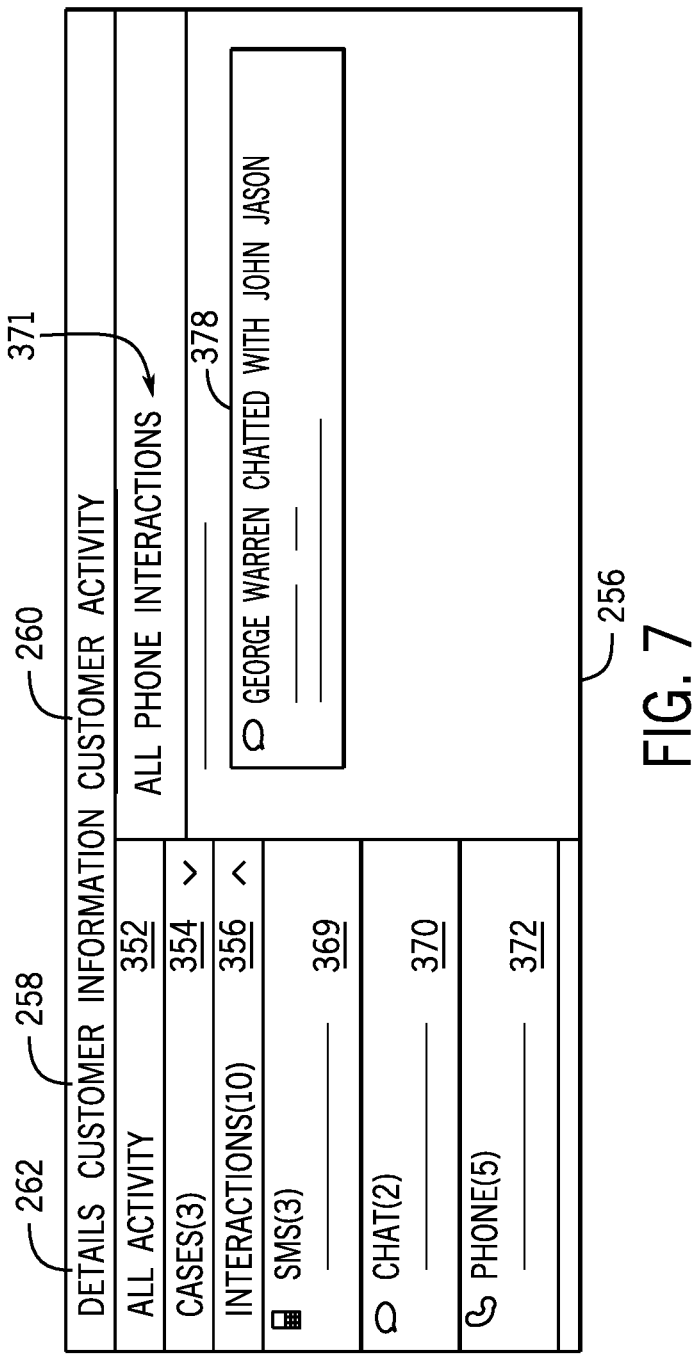
FIG. 7 is a portion of the GUI of FIG. 5 with a chat facet selected, in accordance with aspects of the present disclosure.

FIG. 7 represents an embodiment of the details frame 256 when the interactions facet 356 is selected and/or expanded and the chat facet 370 is selected within the interactions facet 356. In response to the selection of the chat facet 370, the details frame 256 is changed to show one or more chat logs 378.

Figure 8:
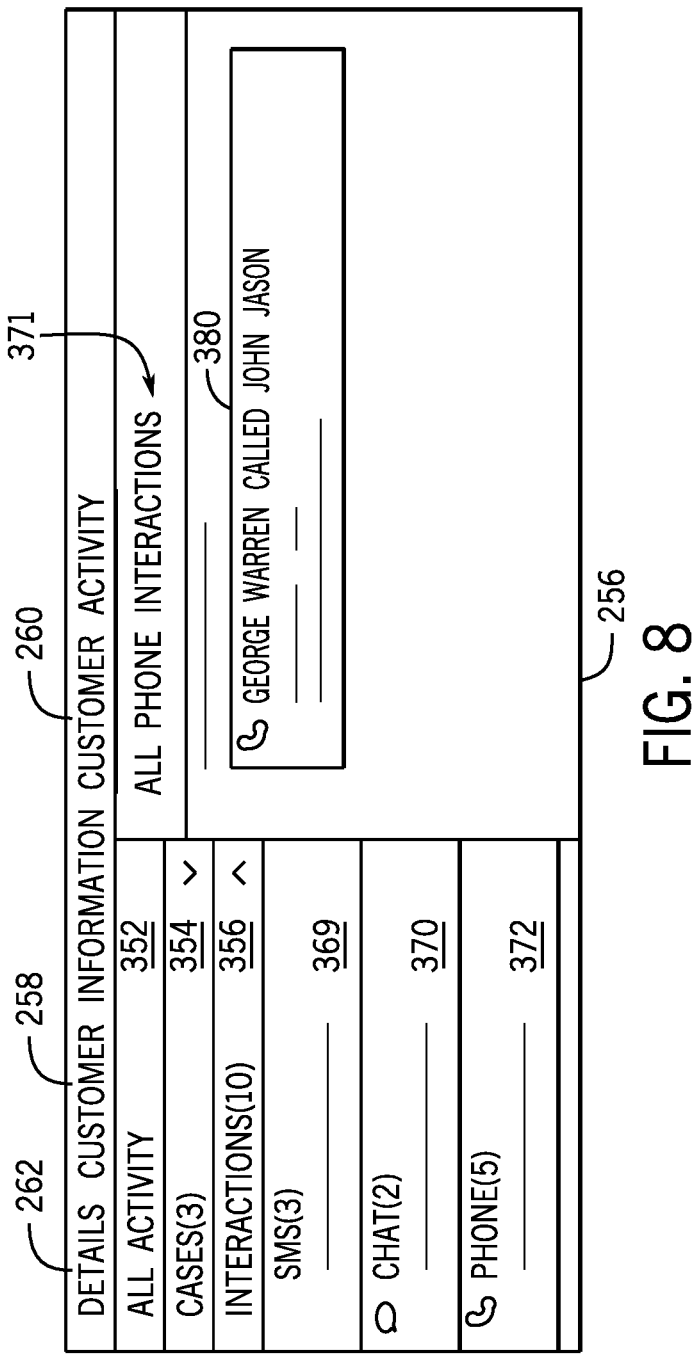
FIG. 8 is a portion of the GUI of FIG. 5 with a phone facet selected, in accordance with aspects of the present disclosure.

FIG. 8 represents an embodiment of the details frame 256 when the interactions facet 356 is selected and/or expanded and the phone facet 372 is selected within the interactions facet 356. In response to the selection of the phone facet 372, the details frame 256 is changed to show one or more phone logs 380 with a time for the phone calls, an interaction record number for the interaction, and a short description of the calls. Some phone logs 380 may include a transcript (e.g., computer generated transcription using speech-to-text translation).

Figure 9:
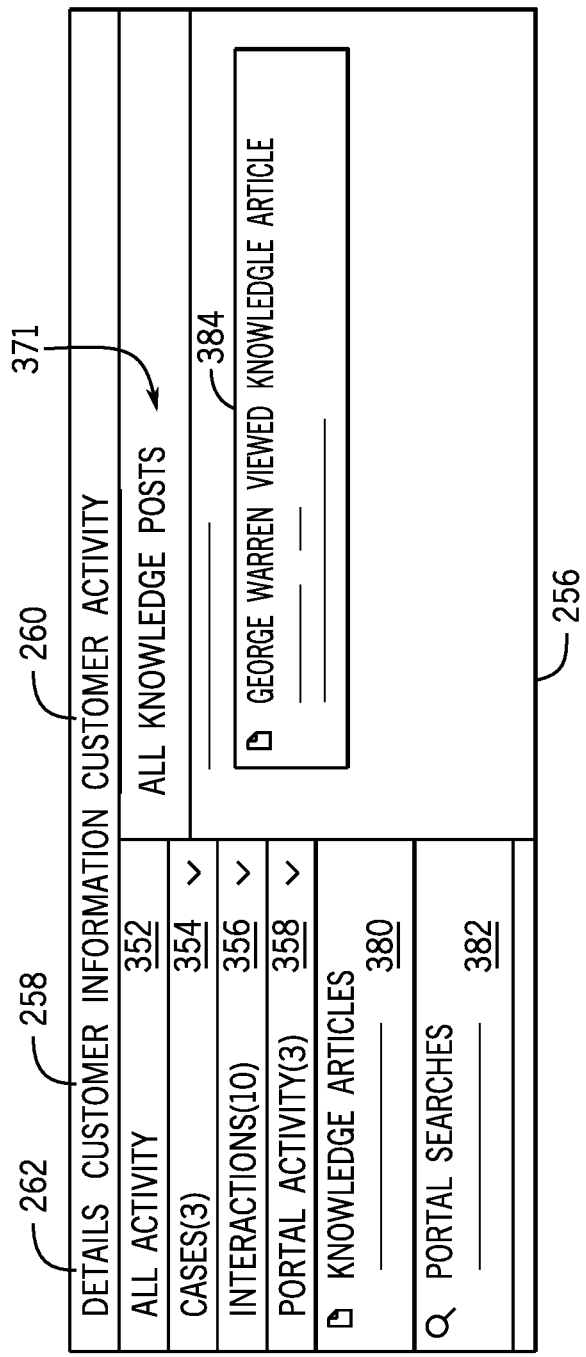
FIG. 9 is a portion of the GUI of FIG. 5 with a knowledge article facet selected, in accordance with aspects of the present disclosure.

FIG. 9 represents an embodiment of the details frame 256 when the portal activity facet 358 is selected and/or expanded. Based on the selection/expansion, the details frame 256 is used to display a knowledge articles facet 380 and a portal searches facet 382. In FIG. 9, the knowledge article facet 380 is selected causing the GUI 250 to display a list 384 of one or more knowledge articles that have been viewed by the customer. The details frame 256 may also be used to show an identifier, such as a title or index number, of the knowledge article. Additionally or alternatively, the list may include a time that the respective knowledge articles have been viewed. Furthermore, the list may include a brief description of the problem that led the customer to review the knowledge articles, such as a portal search performed by the customer that led to the knowledge article. Similar to the knowledge article listings in the customer information screens, a selection of a knowledge article in the list 384 may open the knowledge article (e.g., in a new tab).

Figure 10:
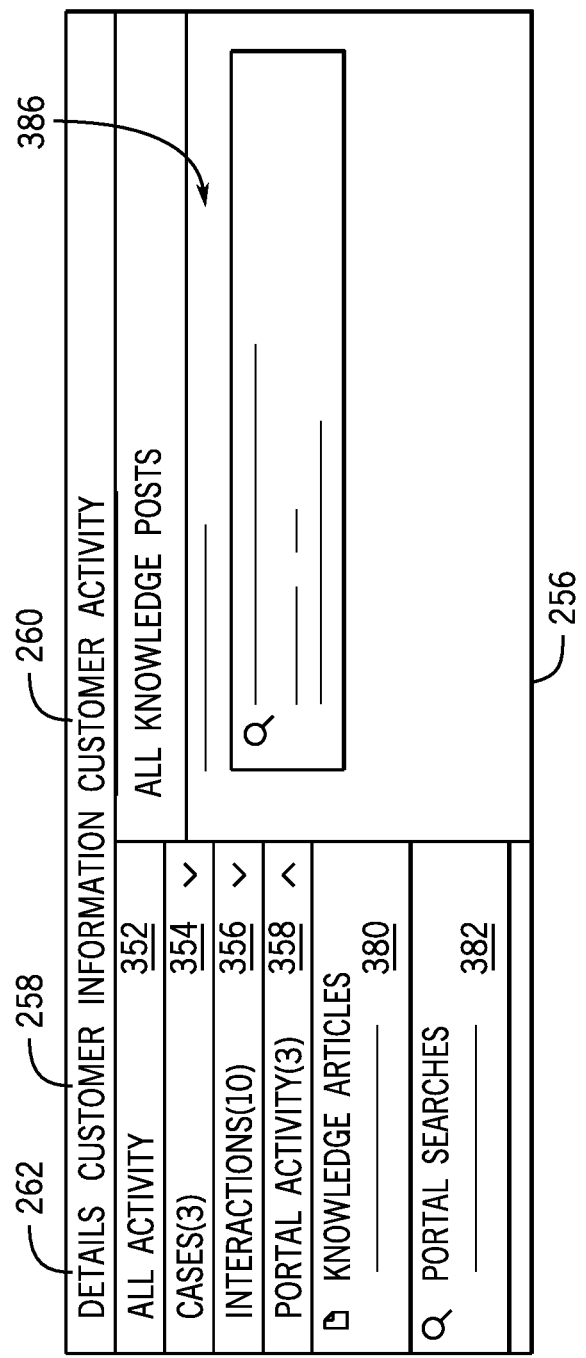
FIG. 10 is a portion of the GUI of FIG. 5 with a portal searches facet selected, in accordance with aspects of the present disclosure.

FIG. 10 represents an embodiment of the details frame 256 when the portal activity facet 358 is selected and/or expanded and the portal searches facet 382 is selected within the interactions facet 356. In response to the selection of the portal searches facet 382, the details frame 256 is changed to show a list 384 of one or more portal searches that have been performed by the customer. The details frame 256 may also be used to show a text string that was used in the portal search. Additionally or alternatively, the list may include a time that the portal searches have been conducted. A selection of a portal search in the list 386 may open the results of the portal search (e.g., in a new tab).

Figure 11:
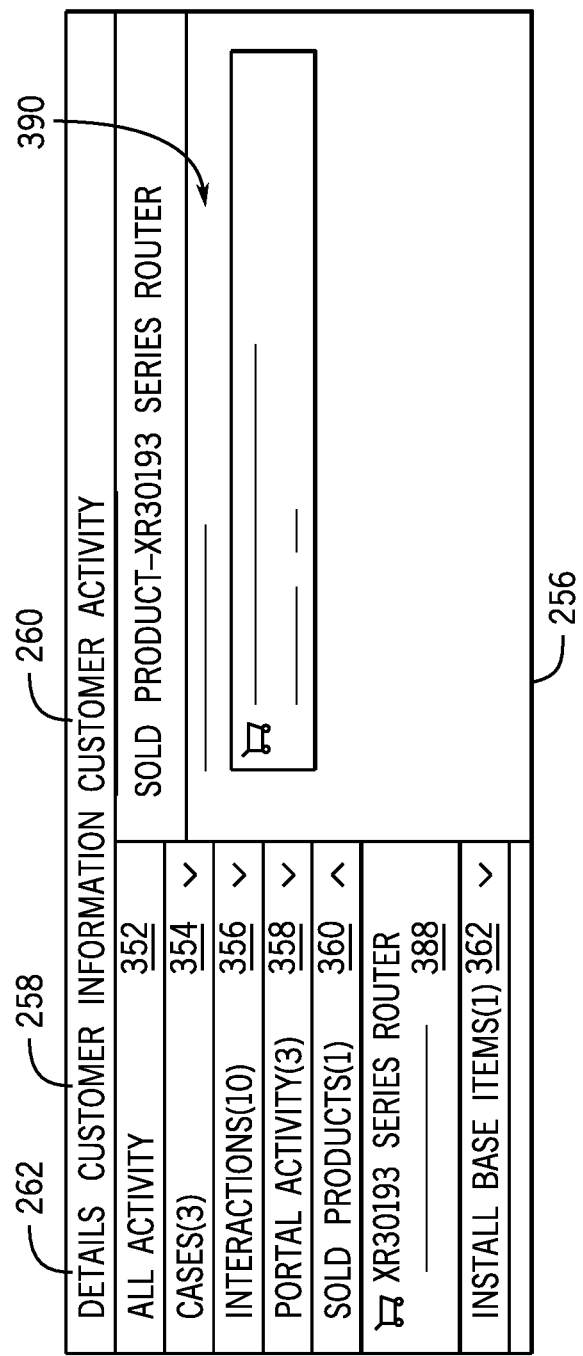
FIG. 11 is a portion of the GUI of FIG. 5 with a particular sold products facet selected, in accordance with aspects of the present disclosure.

FIG. 11 represents an embodiment of the details frame 256 when the sold products facet 360 is selected and/or expanded. When the sold products facet 360 is selected and expanded, one or more sold products may be presented with their own facets. For example, a router facet 388 may indicate a router that has been purchased by the customer/account/contact. The router facet 388 may display a title of the product (e.g., XR30193 Series Router). Upon selection of the router facet 388 or other facets of other sold products, the GUI 250 may display product information 390 corresponding to the sold product. For instance, the product information 390 may include a product identifier and a date of the purchase. Additionally, in some embodiments, the product information 390 may be selected to open up a product information and/or support page.

In addition to or alternative to the individual product facets, an outage facet may be presented that, upon selection, shows known past, present, or future outages of corresponding products that the agent may share with the customer.

Figure 12:
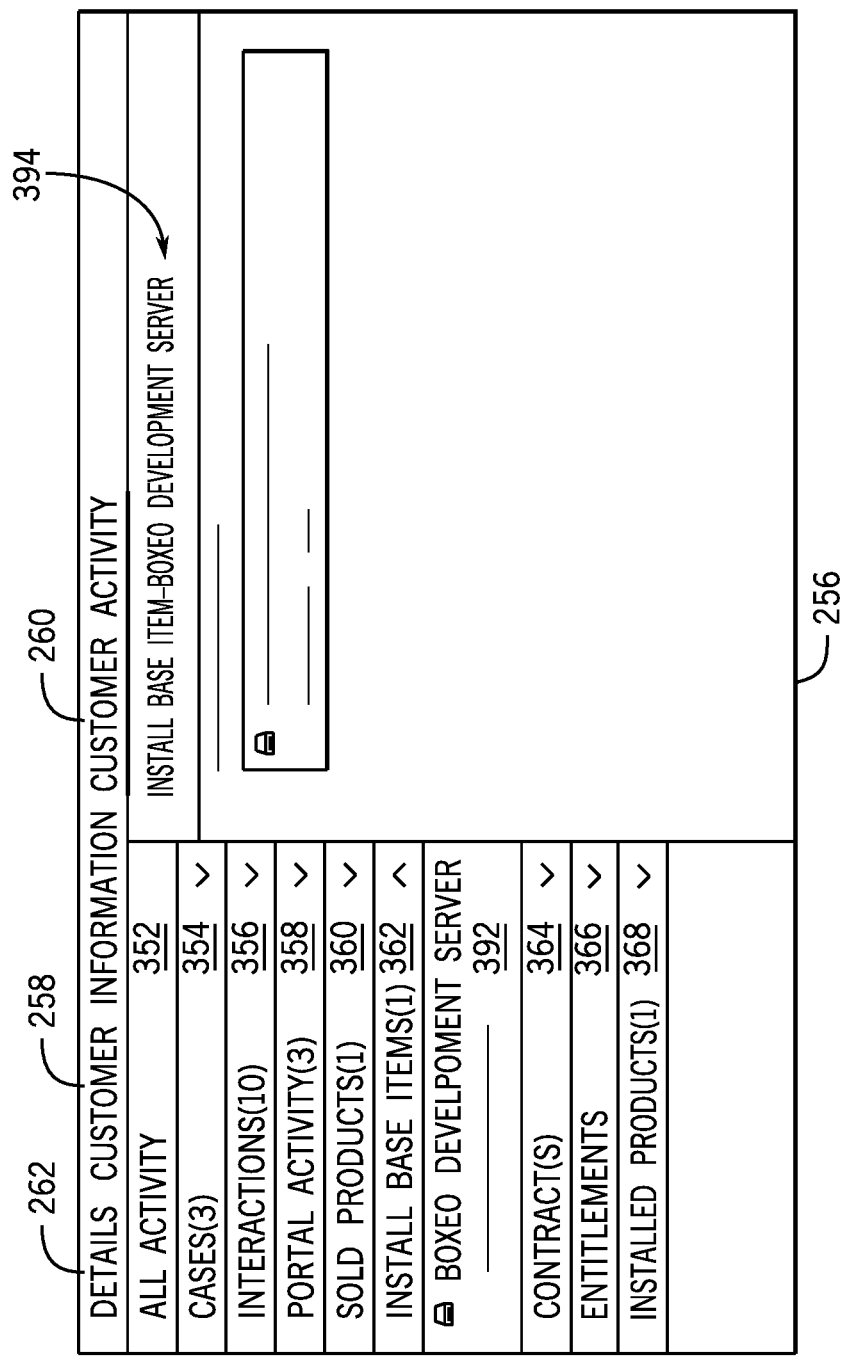
FIG. 12 is a portion of the GUI of FIG. 5 with an installed base item facet selected, in accordance with aspects of the present disclosure.

FIG. 12 represents an embodiment of the details frame 256 when the installed base items facet 362 is selected and/or expanded. When the installed base items facet 362 is selected and expanded, one or more base items may be presented with their own facets. For example, a development server facet 392 may indicate that a development server has been purchased by the customer/account/contact. Upon selection of the development server facet 392 or other facets of other purchased/installed base items, the GUI 250 may display base item information 394 corresponding to the installed base items. For instance, the base item information 394 may include an installed base identifier and a date of the purchase/install. Additionally, in some embodiments, the installed base item information 394 may be selected to open up a more detailed view of the installed base item information and/or a support page for the installed base item.

Figure 13:
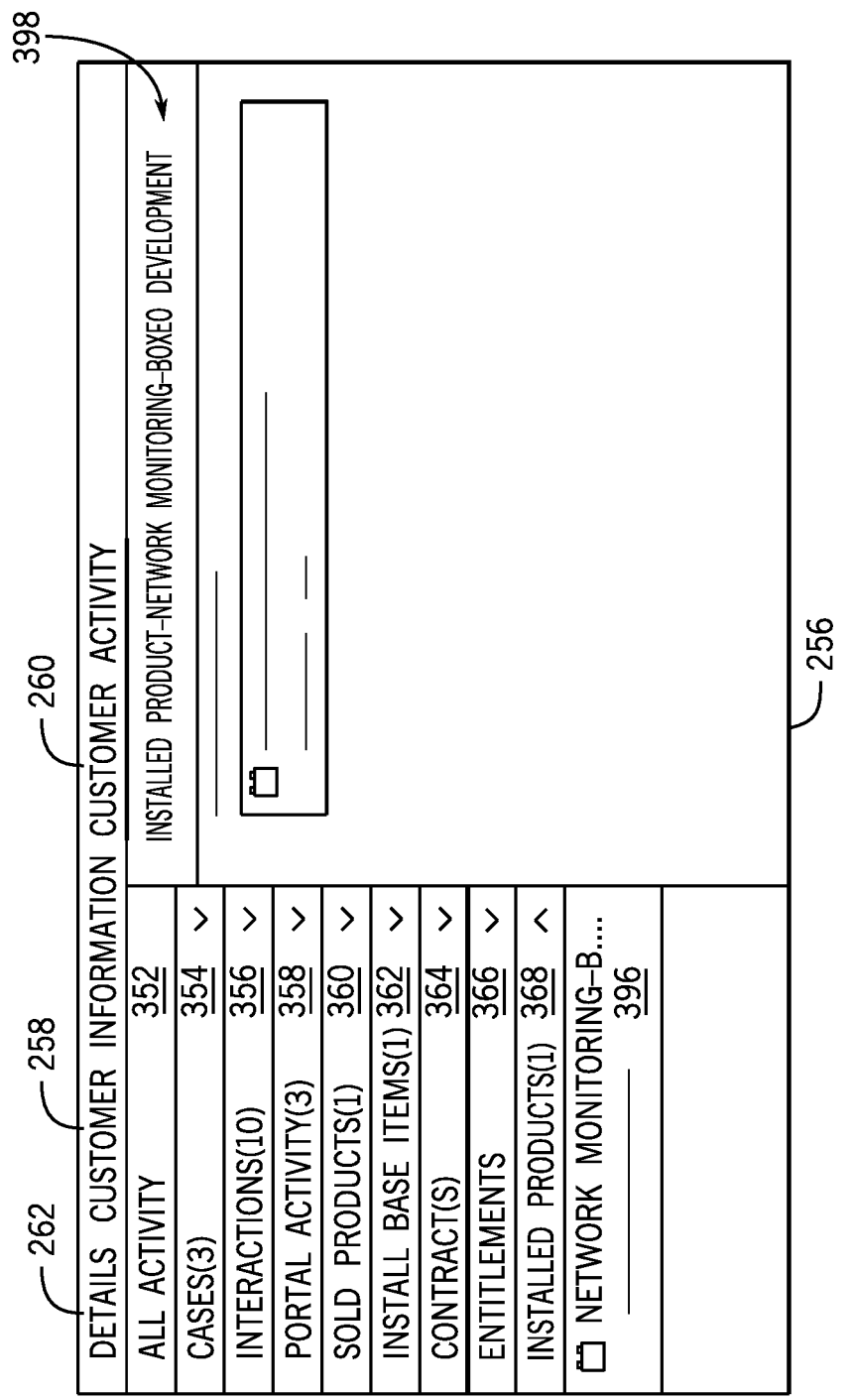
FIG. 13 is a portion of the GUI of FIG. 5 with a network monitoring installed product facet selected, in accordance with aspects of the present disclosure.

FIG. 13 represents an embodiment of the details frame 256 when the installed products facet 368 is selected and/or expanded. When the installed products facet 368 is selected and expanded, one or more installed products may be presented with their own facets. For example, a network monitoring facet 396 may indicate that network monitoring has been purchased by the customer/account/contact. Upon selection of the network monitoring facet 396 or other facets of other installed products, the GUI 250 may display installed product information 398 corresponding to the installed products. For instance, the installed product information 398 may include an installed product identifier, a date of the purchase/install, and/or an account used to install the products. Additionally, in some embodiments, the installed products information 398 may be selected to open an installed products information and/or support page for the installed product.

Figure 14:
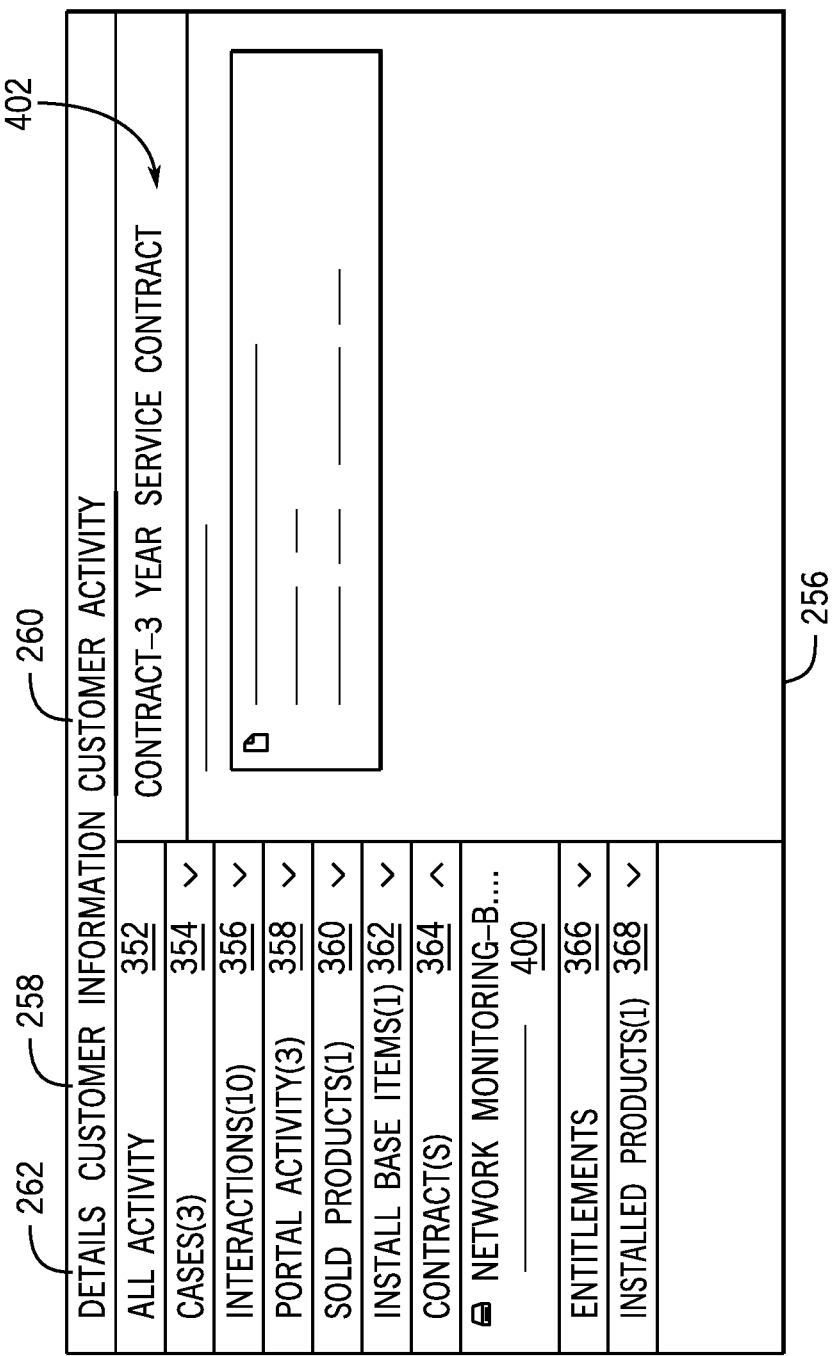
FIG. 14 is a portion of the GUI of FIG. 5 with a network monitoring contract facet selected, in accordance with aspects of the present disclosure.

FIG. 14 represents an embodiment of the details frame 256 when the contracts facet 364 is selected and/or expanded. When the contracts facet 364 is selected and expanded, one or more contracts may be presented with their own facets. For example, a network monitoring facet 400 may indicate that a network monitoring contract is in effect and/or has been purchased for the customer/account/contact. Upon selection of the network monitoring facet 400 or other facets of other contracts, the GUI 250 may display contract information 402 for the selected contract. For instance, the contract information 402 may include a contract record identifier, a contract name, a start date for the contract, an end date for the contract, and/or other information about the contract.

Figure 15:
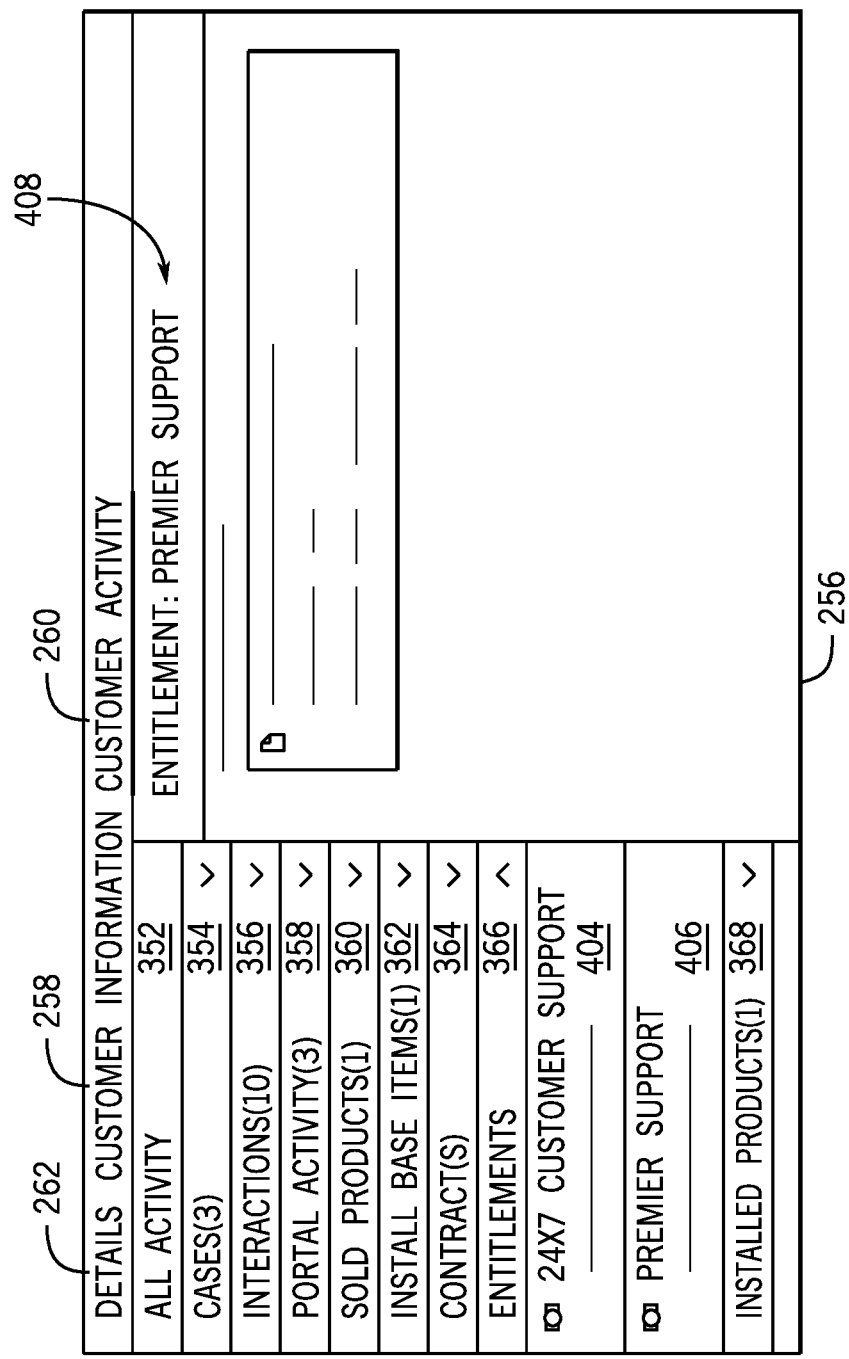
FIG. 15 is a portion of the GUI of FIG. 5 with a support entitlement facet selected, in accordance with aspects of the present disclosure.

FIG. 15 represents an embodiment of the details frame 256 when the entitlements facet 366 is selected and/or expanded. When the entitlements facet 366 is selected and expanded, one or more products/services to which the customer is entitled may be presented with their own facets. For example, a 24×7 customer service facet 404 may indicate that that the customer is entitled to customer service any time and any day. A premiere support facet 406 may indicate that the customer is entitled to an elevated tier of support. Upon selection of the 24×7 customer service facet 404, the premiere support facet 406, and/or other facets of other entitlements, the GUI 250 may display entitlement information 408 for the selected entitlement. For instance, the entitlement information 408 may include an entitlement name, a start date for the entitlement, an end date for the entitlement, and/or other information about the entitlement.

Figure 16:
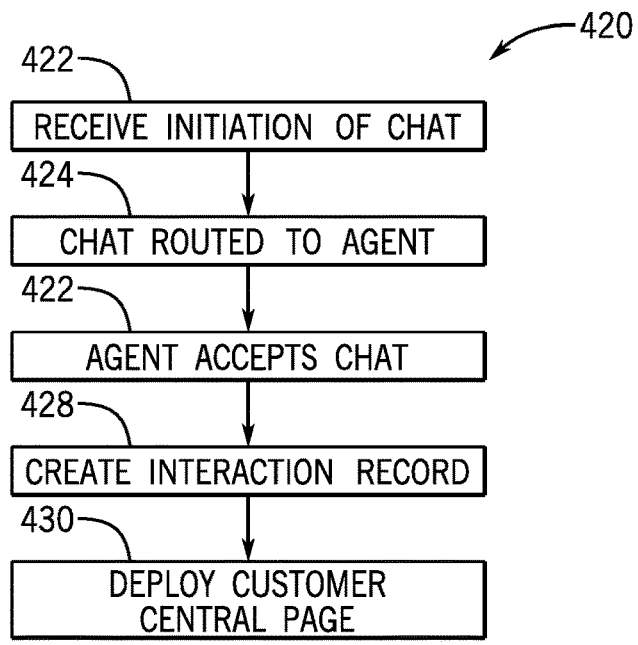
FIG. 16 is a flow diagram of a process used to field incoming chat messages using the GUI of FIGS. 4 and 5, in accordance with aspects of the present disclosure.

Using the foregoing features discussed in relation to the GUI 250, the GUI 250 may be utilized by one or more agents to perform support tasks to customers through one or more communication channels. FIG. 16 reflects a process 420 where the platform 16 receives a chat initiation (block 422). For instance, the customer is logged into a portal for the platform when requesting a chat session. The platform 16 routes the chat request to an agent (block 424). When the agent accepts the chat request via the agent device 28, the platform 16 receives an indication of the chat acceptance (block 426). If the chat is not accepted by the agent within a threshold amount of time or is declined by the agent, the chat may be forwarded to a different agent until an agent accepts the chat. The platform 16 then creates an interaction record in an interaction database using the customer login and the chat request (block 428). The platform 16 then presents a customer/account/contact or customer central page to the agent via the agent device 28 (block 430). Through this page, the platform 16 may create new cases, update existing cases, update customer/account/contact information, reviewing past interactions, and/or responding to the customer.

Figure 17:
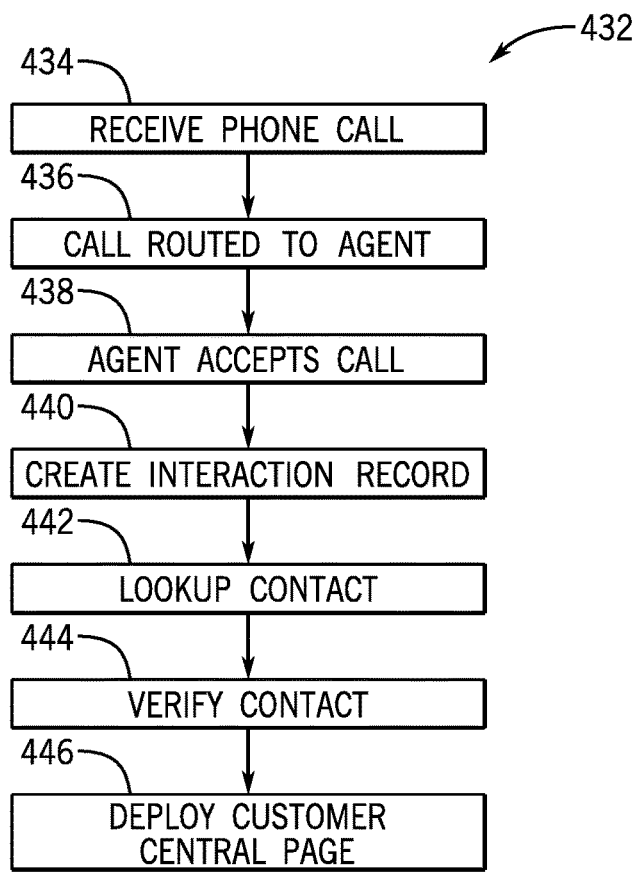
FIG. 17 is a flow diagram of a process used to field incoming calls using the GUI of FIGS. 4 and 5, in accordance with aspects of the present disclosure.

FIG. 17 represents a process 432 where a call center of the platform 16 receives a phone call (block 434). The platform 16 routes the call to the agent via the agent device 28 (block 436). For example, the platform 16 may route the call to the agent device using call forwarding or voice-over-IP (VOIP) routing. The platform 16 receives an indication that the agent has accepted the call (block 438). For example, the GUI 250 may receive a selection of a button, the call may be picked up by the agent, and/or another indication that results from the agent accepting the call. In response to the platform 16 receiving the indication, the platform 16 creates an interaction record in a corresponding interaction database to record the interaction (block 440). Before or after creating the interaction record, the platform 16 looks up the contact in a contact database (block 442). For example, the platform 16 identifies a number from which the customer has called and may identify the contact by comparing the number with the contacts in the contacts database. In some embodiments, the platform 16 then verifies the contact (block 444). For instance, in an automated menu, the platform 16 may ask the caller to confirm the association with a contact entry in the contacts database. Additionally or alternatively, the platform 16 may instruct, via the GUI 250, the agent to confirm the contact. For instance, the GUI 250 may cause a message (e.g., email or SMS message) to be pushed to a contact with a pin used to indicate that the customer contact is who they purport to be.

After looking up the contact, the platform 16 may cause the GUI 250 to display a customer/account/contact or customer central page to the agent via the agent device 28 (block 446). Additionally or alternatively, the platform 16 may highlight or present a most recently opened case, most recently discussed case, or other interactions with the contact based on most likely (e.g., most recent) interactions. Through this page, the platform 16 may create new cases, update existing cases, update customer/account/contact information, facilitate reviewing past interactions, and/or allow responding to the customer.

Figure 18:
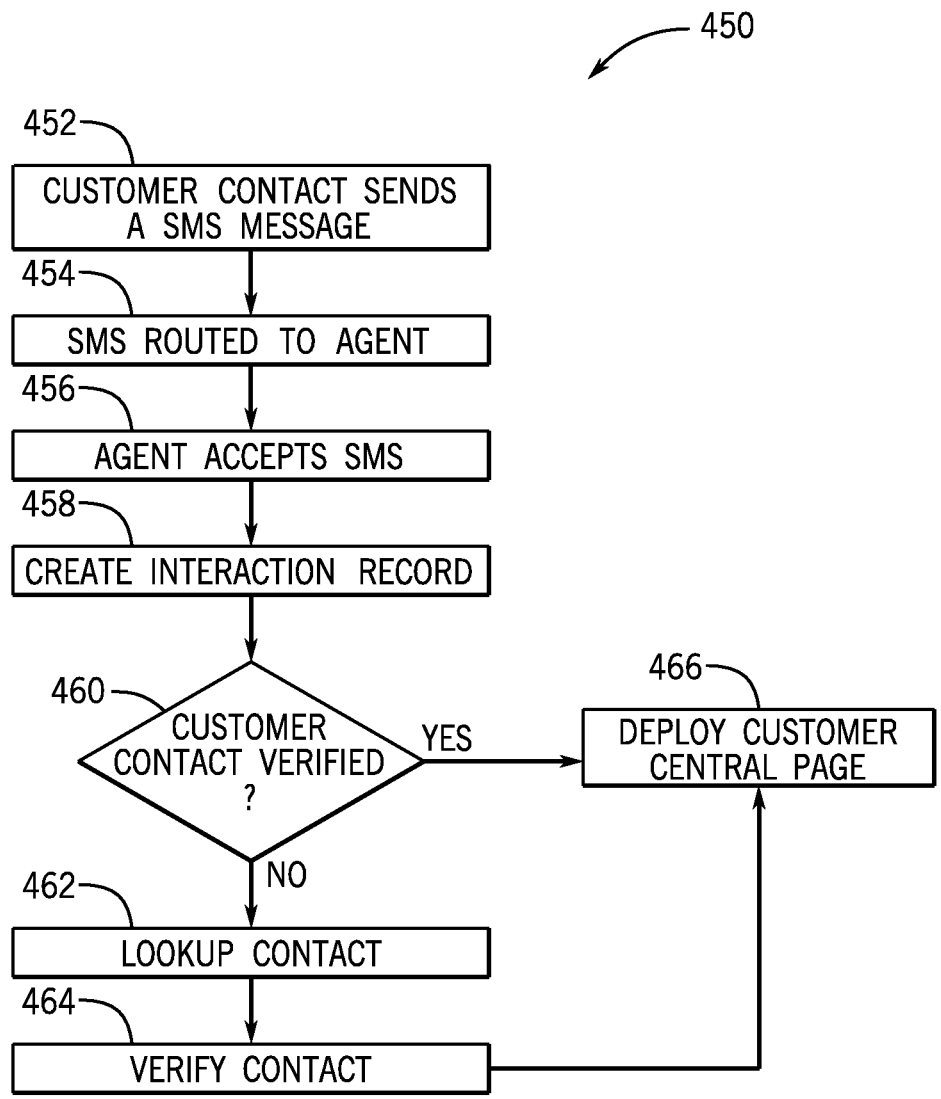
FIG. 18 is a flow diagram of a process used to field incoming SMS messages using the GUI of FIGS. 4 and 5, in accordance with aspects of the present disclosure.

FIG. 18 represents a process 450 where the platform 16 receives an SMS message (block 452). The SMS message may be an SMS message that initiates a conversation. Additionally or alternatively, the SMS message may be a reply to previous SMS messages to the customer. For example, the previous SMS messages may be sent by an agent in a previous conversation (e.g., from a previous day), may be sent by a virtual agent in assisting the customer, and/or any other previous messages. For instance, if the previous messages include virtual agent messaging, the platform 16 may determine that the virtual agent has been unsuccessful in assisting the customer. Additionally or alternatively, the platform 16 may receive an indication that the customer wants to escalate the interaction. For example, the indication may include an SMS message from the customer that requests escalation (e.g., "Escalate" in an SMS message).

The platform 16 routes the SMS message to the agent via the agent device 28 (block 454). For example, the platform 16 may route the SMS to the agent device using message forwarding through a cellular network, a wide area network (WAN), a local area network (LAN), or a combination thereof. The platform 16 receives an indication that the agent has accepted the SMS message (block 456). For example, the GUI 250 may receive a selection of a button, the SMS message may be responded to by the agent, and/or another indication that results from the agent accepting the SMS message. In response to the platform 16 receiving the indication, the platform 16 creates an interaction record in a corresponding interaction database to record the SMS interaction (block 458).

Before or after creating the interaction record, the platform 16 may determine whether the customer contact is verified (block 460). The verification may include determining whether a number used to send the SMS is associated with an account, determining whether the number used to send the SMS is the number to be used for checking for an affiliation with an account (e.g., ask the customer), instructing the agent, via the GUI 250, to confirm the contact number with the customer, and/or other methods of verifying the contact information. Additionally or alternatively, the customer contact verification may include the platform 16 using an automated confirmation system to verify various information about the contact, such as a name, a password phrase, an email address, an address, a company name, a local times zone for the customer, an account status for the account, one or more phone numbers, and/or other information about the contact.

If contact information is not provided and/or verified, the platform may look up a contact in a contact database (block 462). For example, the platform 16 may receive information from the customer (e.g., name, password, etc.) via the agent and/or an automated system. In some embodiments, the platform 16 then verifies the contact (block 464). For instance, in an automated menu, the platform 16 may ask the caller to confirm the association with a contact entry in the contacts database. Additionally or alternatively, the platform 16 may instruct, via the GUI 250, the agent to confirm the contact. For instance, the GUI 250 may cause a message (e.g., email or SMS message) to be pushed to a contact with a personal identification number (i.e., a "pin") used to indicate that the customer contact is who they purport to be.

After looking up the contact, the platform 16 may cause the GUI 250 to display a customer/account/contact or customer central page to the agent via the agent device 28 (block 466). Additionally or alternatively, the platform 16 may highlight or present a most recently opened case, most recently discussed case, or other interactions with the contact based on most likely (e.g., most recent) interactions. Through this page, the platform 16 may create new cases, update existing cases, update customer/account/contact information, facilitate review of past interactions, and/or allow responding to the customer.

Figure 19:
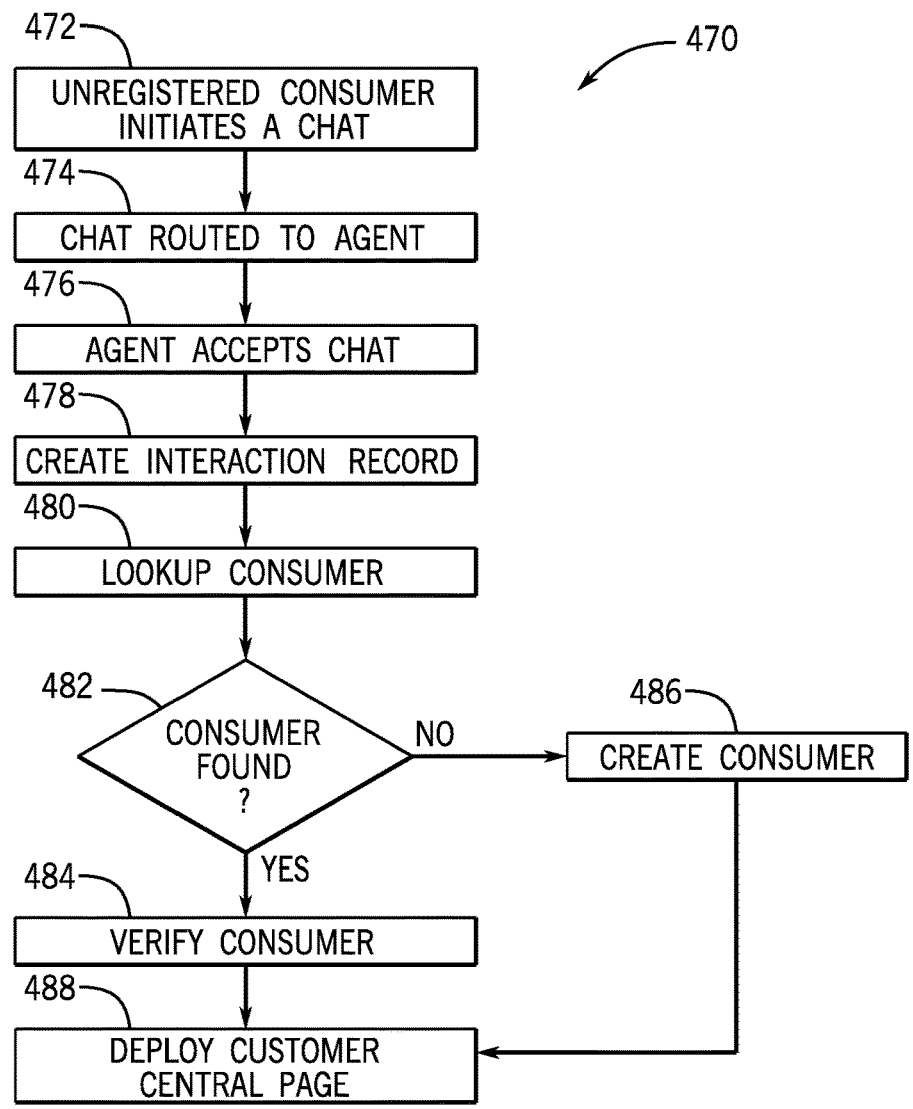
FIG. 19 is a flow diagram of a process used to field incoming chat messages from an unregistered consumer using the GUI of FIGS. 4 and 5, in accordance with aspects of the present disclosure.

FIG. 19 represents a process 470 where the platform 16 receive an initiation of a chat from an unverified user (block 472). For instance, the user may request a chat without logging into a customer portal. The platform 16 routes the chat message to the agent via the agent device 28 (block 474). The platform 16 receives an indication that the agent has accepted the chat message (block 476). For example, the GUI 250 may receive a selection of a button, a chat response to the message, and/or another indication that results from the agent accepting the chat request. In response to the platform 16 receiving the indication, the platform 16 creates an interaction record in a corresponding interaction database to record the chat interaction (block 478).

Before or after creating the interaction record, the platform 16 may look up a contact in a contact database (block 480). The platform 16 may then determine whether the contact corresponds to a consumer/customer in a contact database. For example, the platform 16 may receive information from the customer/consumer (e.g., name, password, etc.) via the agent and/or an automated system for the lookup. In some embodiments, the platform 16 then verifies the customer/consumer (block 482). For instance, in an automated menu, the platform 16 may ask the customer/consumer to confirm the association with a contact entry in the contacts database. Additionally or alternatively, the platform 16 may instruct, via the GUI 250, the agent to confirm the contact information (e.g., name, password, etc.). Additionally or alternatively, the GUI 250 may cause a message (e.g., email or SMS message) to be pushed to a contact path with a pin used to indicate that the customer/consumer contact is who they purport to be.

If no customer/consumer is found, the platform 16, via the GUI 250, may instruct the agent to create a new contact (e.g., register an unregistered consumer) or may automatically create a customer/consumer record (block 486). After creating the contact or looking up the contact, the platform 16 may cause the GUI 250 to display a customer/account/contact or customer central page to the agent via the agent device 28 (block 488). Additionally or alternatively, the platform 16 may highlight or present a most recently opened case, most recently discussed case, or other interactions with the contact based on most likely (e.g., most recent) interactions. Through this page, the platform 16 may create new cases, update existing cases, update customer/account/contact information, facilitate review of past interactions, and/or allow responding to the customer in accordance with the previous discussion.

When the call or chat ends, the GUI 250 may instruct an agent to perform a wrap-up. A wrap-up is a recording of a debrief of the conversation between the agent and the customer. During the wrap-up, the GUI 250 enables the agent to confirm/edit all the actions taken during that interaction, and add any other information provided to and/or by the customer. The actions to be confirmed could be viewing a case, updating customer information, sending a knowledge article to the customer, creating a new case, and the like. The GUI 250 may provide agents with a list of actions that the platform 16 tracked during the interaction. Via the GUI 250, the agent may verify if the actions were taken and add more or remove some actions, if needed. By tracking and providing this list, the wrap-up process may be robust and relatively shorter than the agents manually typing summaries in the various locations. However, agents may also be able to enter any free form text in addition to the list of actions provided.

Figure 20:
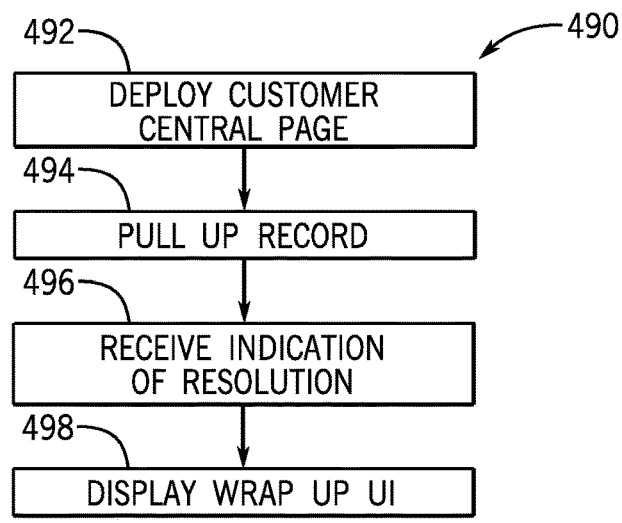
FIG. 20 is a flow diagram of a process used to wrap-up interactions using the GUI of FIGS. 4 and 5, in accordance with aspects of the present disclosure.

FIG. 20 is a flow diagram of a process 490 that may be used to wrap-up an interaction with a contact/account agent/consumer. One of the foregoing interactions is completed using the contact/account/consumer or customer central page (block 492). Within the contact/account/consumer page, platform 16 pulls up a record related to the contact/account/consumer issue (block 494). Using the GUI 250, the platform 16 receives an indication that the issue has been resolved (block 496). In response to this indication, the platform 16 presents, via the GUI 250, a wrap-up page (block 498).

Figure 21:
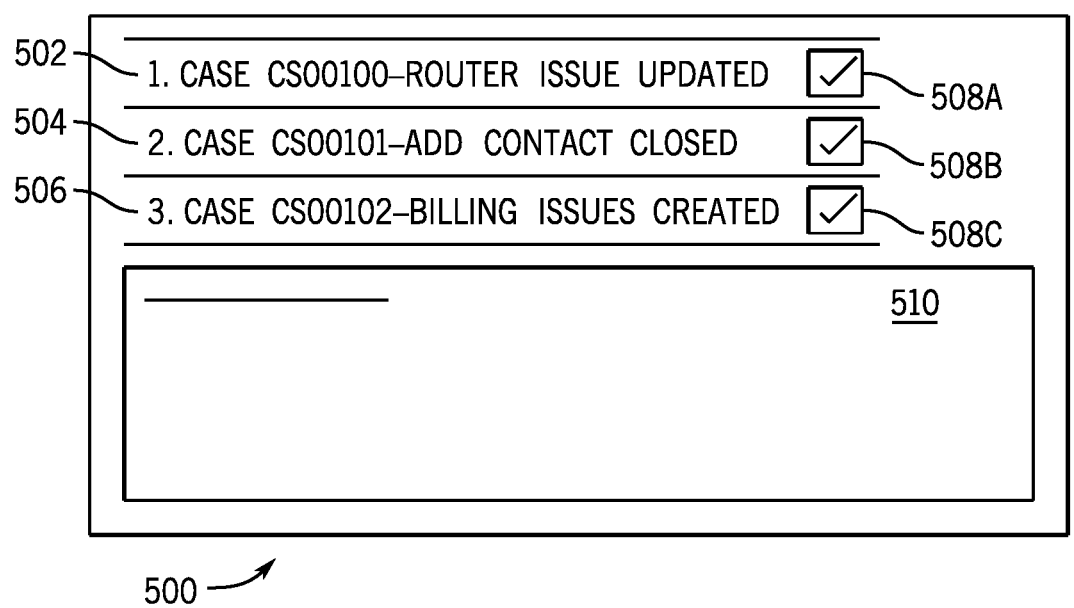
FIG. 21 is a representation of a wrap-up page in the GUI of FIGS. 4 and 5, in accordance with aspects of the present disclosure.

FIG. 21 represents an embodiment of wrap-up page 500. As illustrated, the wrap-up page 500 includes indicators 502, 504, and 506 corresponding to actions that have been taken during the current interaction being wrapped up. The wrap-up page 500 may also include a confirmation button 508 used to confirm a respective indicator as being correct. The wrap-up page 500 may also include a text box 510 that may be used to input free-form text notes about the interaction. All such text may be stored in the interaction record associated with the interaction. In some embodiments, the changes to databases based on the actions may be delayed until the confirmation via the confirmation indicators 502, 504, and 506 are received.

Figure 22:
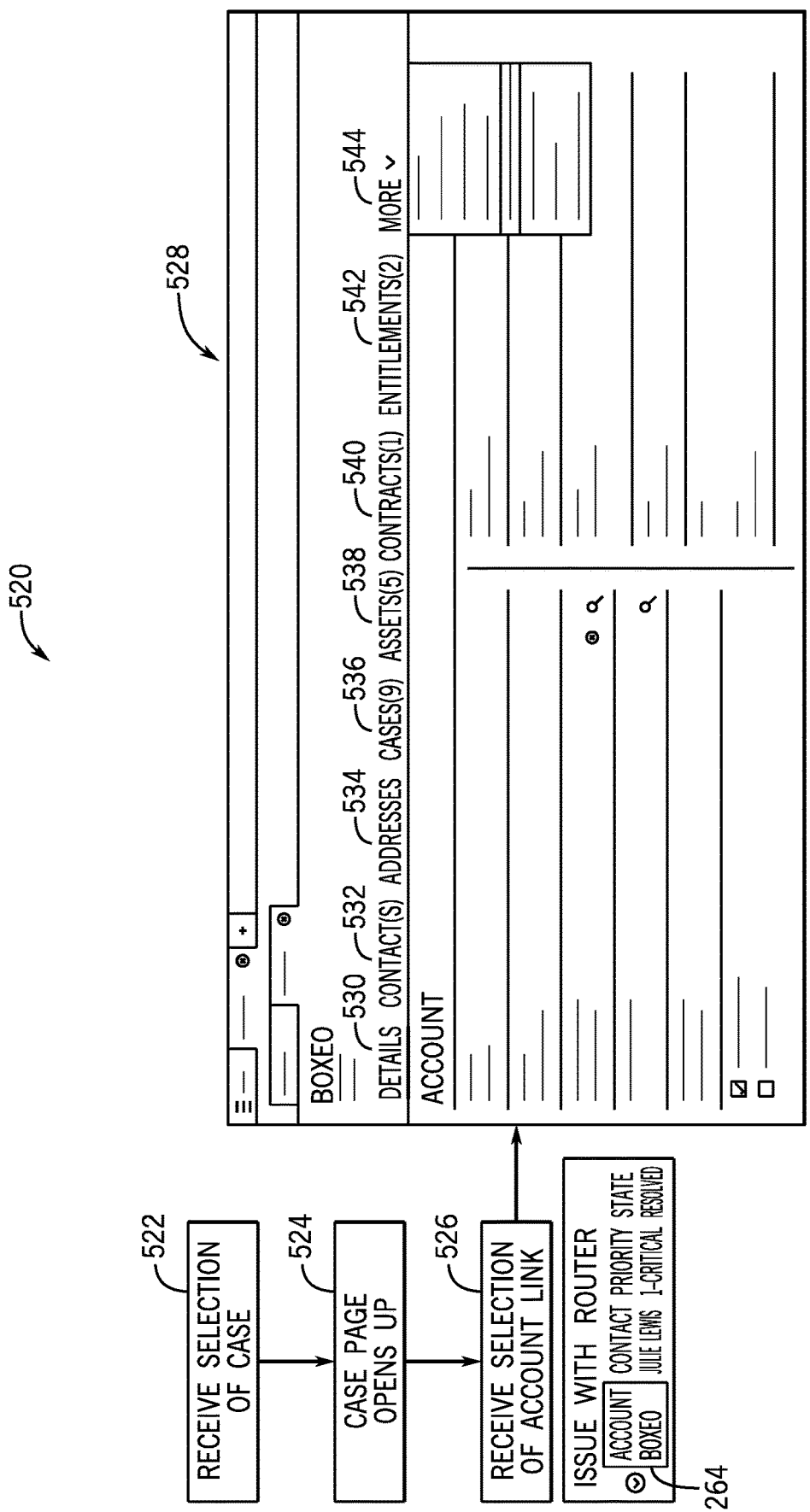
FIG. 22 is a flow diagram of a process used to drill down to account details using the GUI of FIGS. 4 and 5, in accordance with aspects of the present disclosure.

As seen previously, the contact/account/consumer page may dynamically present information based on the agents' interactions with it. However, the contact/account/consumer page may be used as more than a way to view multiple areas at one time. Indeed, as noted above, the contact/account/consumer page may be used to drill down into different details. FIG. 22 illustrates a process 520 used to drill down into account details. An agent may pick a case from a list in the contact/account/consumer page (block 522). For example, the platform 16 may be selected using the cases facet 354. The contact/account/consumer page then opens a case page including case information (block 524). For example, the platform 16 may present the same information that is presented using the cases facet 354. The GUI 250 then receives a selection of an account link via the cases page (block 526). For instance, as illustrated, an item 264 corresponding to the account may be selected. In response to the selection, the GUI 250 presents an account frame 528.

The account frame 528 may cause the GUI 250 to hide certain lists from the contact/account/consumer page. For instance, the recent cases sub-frame 292, a contracts sub-frame, an entitlements sub-frame, a recent phone calls sub-frame 272, a recent portal searches sub-frame 280, a recent chat interactions sub-frame 302, an escalations sub-frame, and/or related lists may be hidden. Instead, tabs may be displayed for the account. For instance, a details tab 530 may be used to view details for the account in the GUI 250. A contacts tab 532 may be used to display contacts for the account. An addresses tab 534 may be used to display addresses associated with the account. A cases tab 536 may be used to display cases associated with the account. An assets tab 538 may be used to display assets associated with the account (e.g., found using discovery operations). A contracts tab 540 may be used to view contracts related to the account. An entitlements tab 542 may be used to view services/products to which the account in entitled. A more tab 544 may be used to view additional tabs to present additional information about the account.

Figure 23:
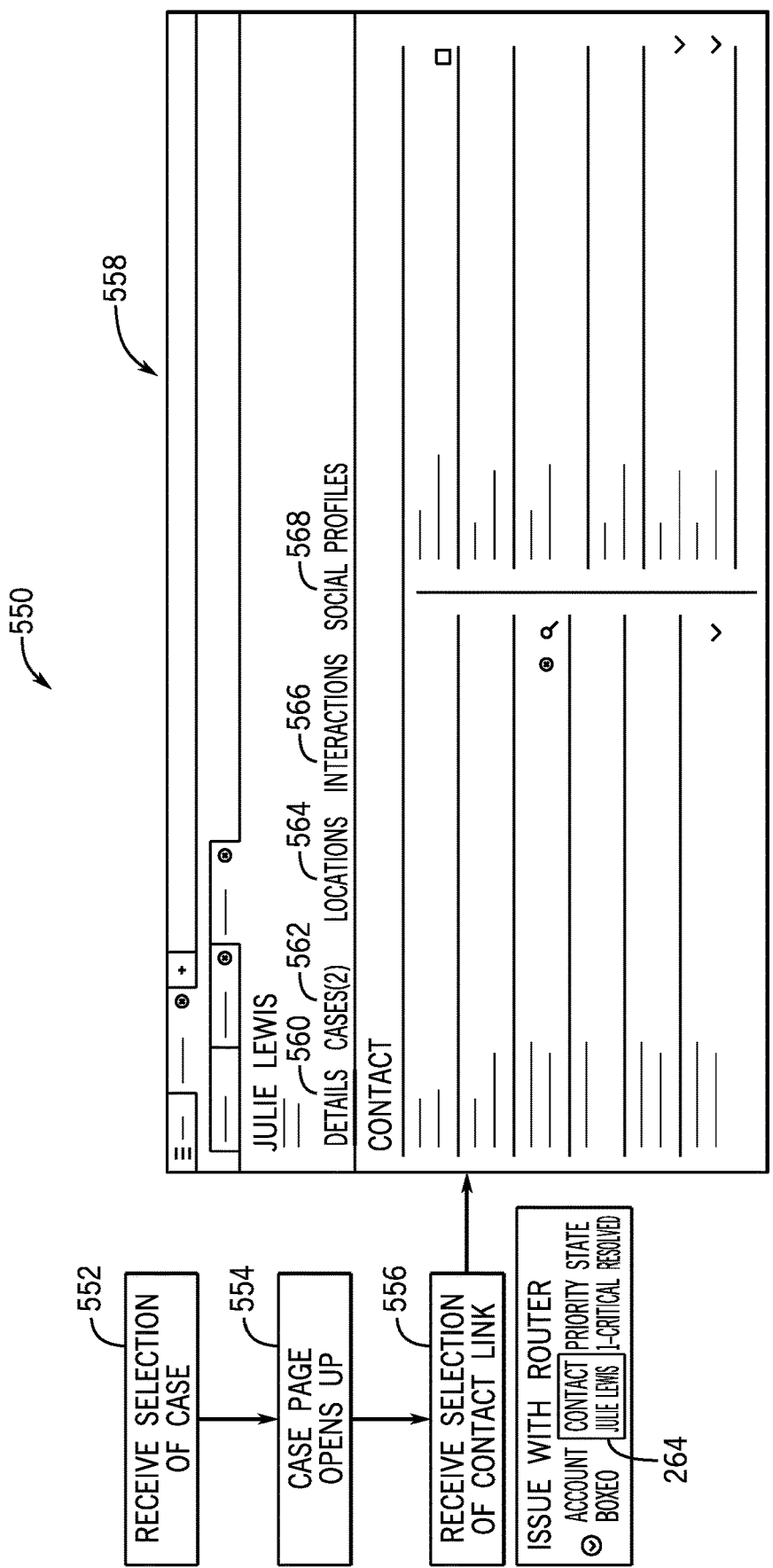
FIG. 23 is a flow diagram of a process used to drill down to contact details using the GUI of FIGS. 4 and 5, in accordance with aspects of the present disclosure.

FIG. 23 illustrates a process 550 used to drill down into contact details for the contact. An agent may pick a case from a list in the contact/account/consumer page (block 552). For example, the platform 16 may be selected using the cases facet 354. The contact/account/consumer page then opens a case page including case information (block 554). For example, the platform 16 may present the same information that is presented using the cases facet 354. The GUI 250 then receives a selection of an account link via the cases page (block 556). For instance, as illustrated, an item 264 corresponding to the contact (e.g., "Julie Lewis") may be selected. In response to the selection, the GUI 250 presents a contact frame 558.

The contact frame 558 may include one or more tabs to display information about the contact. For instance, a details tab 560 may be used to view details for the contact in the GUI 250. A cases tab 562 may be used to display cases associated with the contact. A locations tab 564 may be used to view different locations associated with the contact. An interactions tab 566 may be used to display different interactions that the contact has had with agents using the GUI 250. A social profiles tab 568 may be used to display knowledge articles viewed by the contact/account and/or display portal searches performed by the contact (or another person associated with an account that is also associated with the contact).

Figure 24:
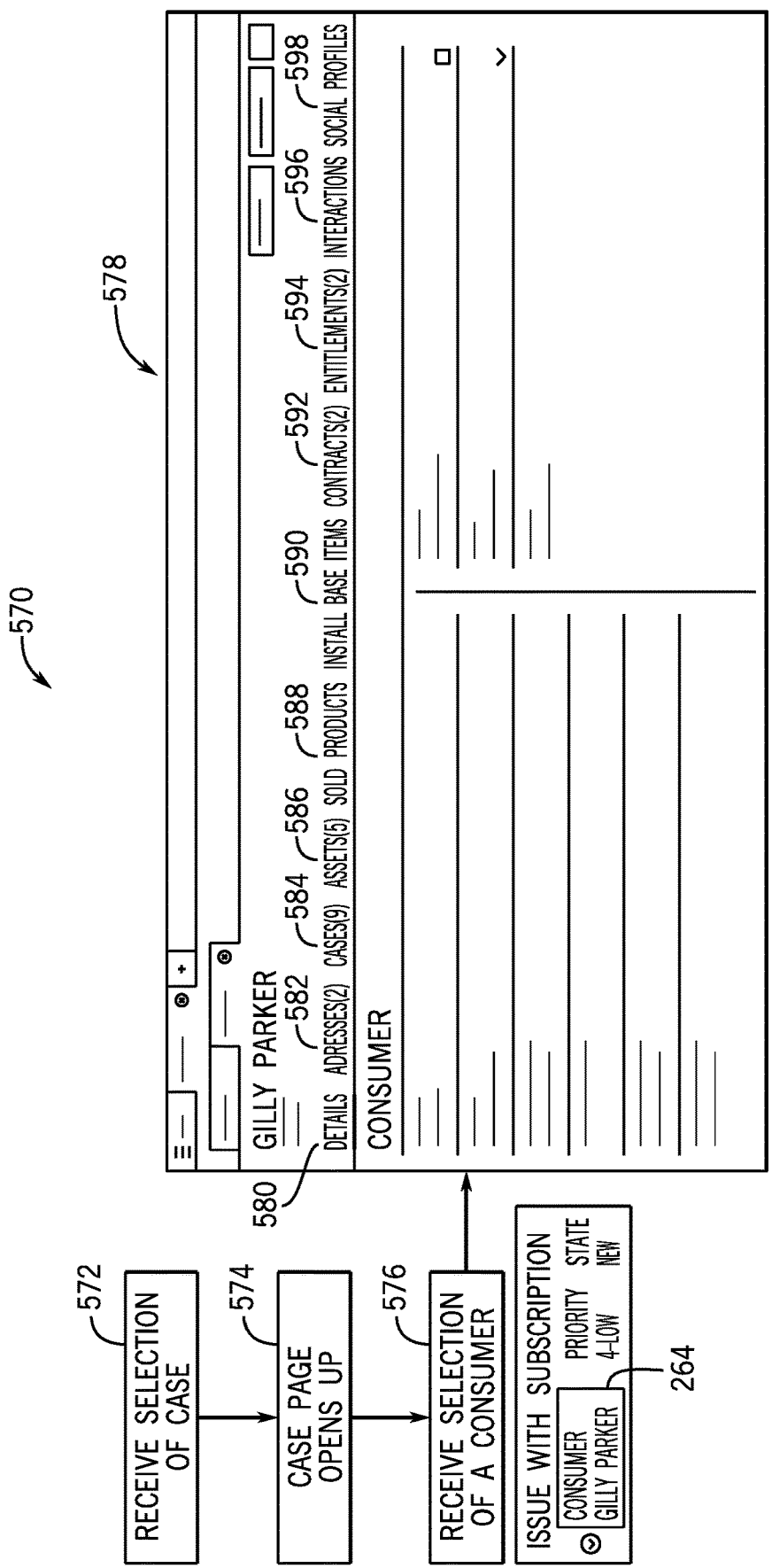
FIG. 24 is a flow diagram of a process used to drill down to consumer details using the GUI of FIGS. 4 and 5, in accordance with aspects of the present disclosure.

FIG. 24 illustrates a process 570 used to drill down into consumer details when a consumer contacts the agent instead of being a contact for a business customer. The agent may pick a case from a list in the contact/account/consumer page (block 572). For example, the platform 16 may be selected using the cases facet 354. The contact/account/consumer page then opens a case page including case information (block 574). For example, the platform 16 may present the same information that is presented using the cases facet 354. The GUI 250 then receives a selection of a link via the cases page (block 576). For instance, as illustrated, an item 264 corresponding to the consumer may be selected. In response to the selection, the GUI 250 presents a consumer frame 578. The consumer frame 578 may include one or more tabs to display information about the consumer. For instance, a details tab 580 may be used to view details about the consumer in the GUI 250. An addresses tab 582 may be used to display addresses associated with the consumer. A cases tab 584 may be used to display cases associated with the consumer. An assets tab 586 may be used to display assets associated with the consumer. A sold products tab 588 may be used to view products sold to the consumer. An installed base items tab 590 may be used to view installed base items for the consumer. A contracts tab 592 may be used to view contracts associated with the consumer. An entitlements tab 594 may be used to view products/services to which the consumer is entitled. An interactions tab 596 may be used to view interactions involving the consumer. A social profiles interactions tab 598 may be used to view knowledge articles searched by the consumer, view searches conducted by the consumer, and/or view posts made or viewed by the consumer.

Figure 25:
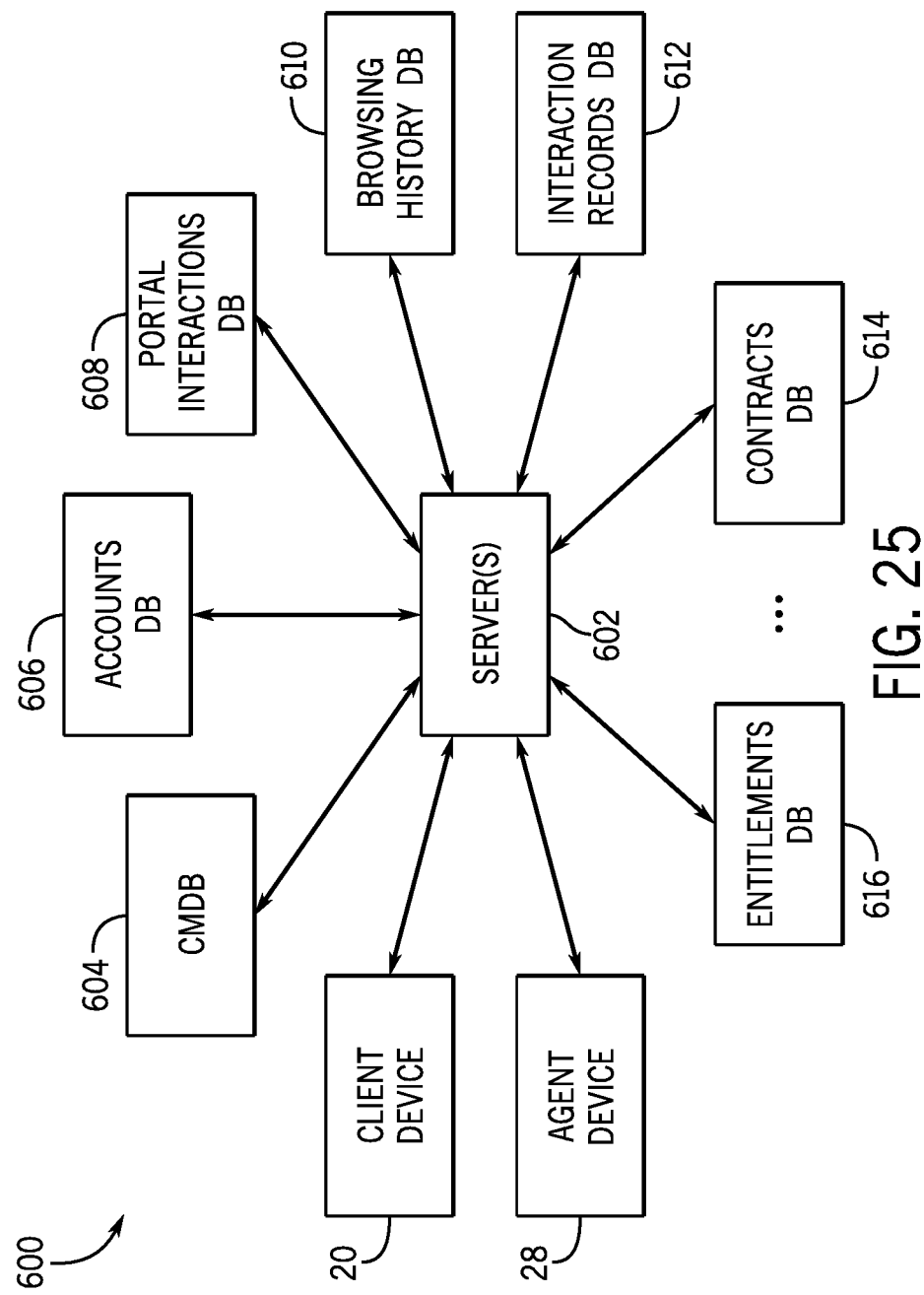
FIG. 25 is a block diagram of an interconnection of a system used to implement the GUI of FIG. 5, in accordance with aspects of the present disclosure.

The foregoing functions discusses as being performed by the platform 16 may be implemented using one or more processors, such as the processor(s) 202 in one or more servers (or other electronic devices) used in implementing the platform 16. These servers may have access to multiple different data sources, such as databases, used to acquire information for presentation in the GUI 250. For instance, FIG. 25 illustrates a block diagram of a system 600 used to present the information in the GUI 250. As illustrated, one or more servers 602 used to implement the platform 16 are connected to multiple databases. For instance, the server(s) 602 may acquire information regarding services and/or devices of the customer from a configuration management database (CMDB) 604. Additionally or alternatively, the server(s) 602 may acquire account information from an accounts database 606. Furthermore, the server(s) 602 may acquire information about portal searches by the contact/an agent of an account/consumer, knowledge articles viewed by the contact/an agent of an account/consumer, and/or posts created or viewed by the contact/an agent of an account/consumer from a portal interactions database 608 and/or a browsing history database 610. The server(s) 602 may acquire information about previous interactions with the contact/account/consumer via an interactions database 612. In some embodiments, different interactions of different types may be stored in different databases or locations. For example, an SMS interactions database may track SMS interactions, a call interactions database may track telephone calls between agents and the contact/account/consumer, a chat interactions database may track chat interactions between agents and the contact/account/consumer. The server(s) 602 may acquire contract information for the contact/account/consumer from a contracts database 614. The server(s) 602 may acquire entitlements information from an entitlements database 616. In some embodiments, at least some information may be acquired from the customer or the client device 20 used by the customer to contact the agent. In some embodiments, at least some of the databases used by the server(s) 602 may be combined into a single database. Additionally or alternatively, at least some of the databases may be split into multiple databases. Furthermore, in certain embodiments, fewer or more databases may be used to access additional or different information that may be presented in the GUI 250.

Figure 26:
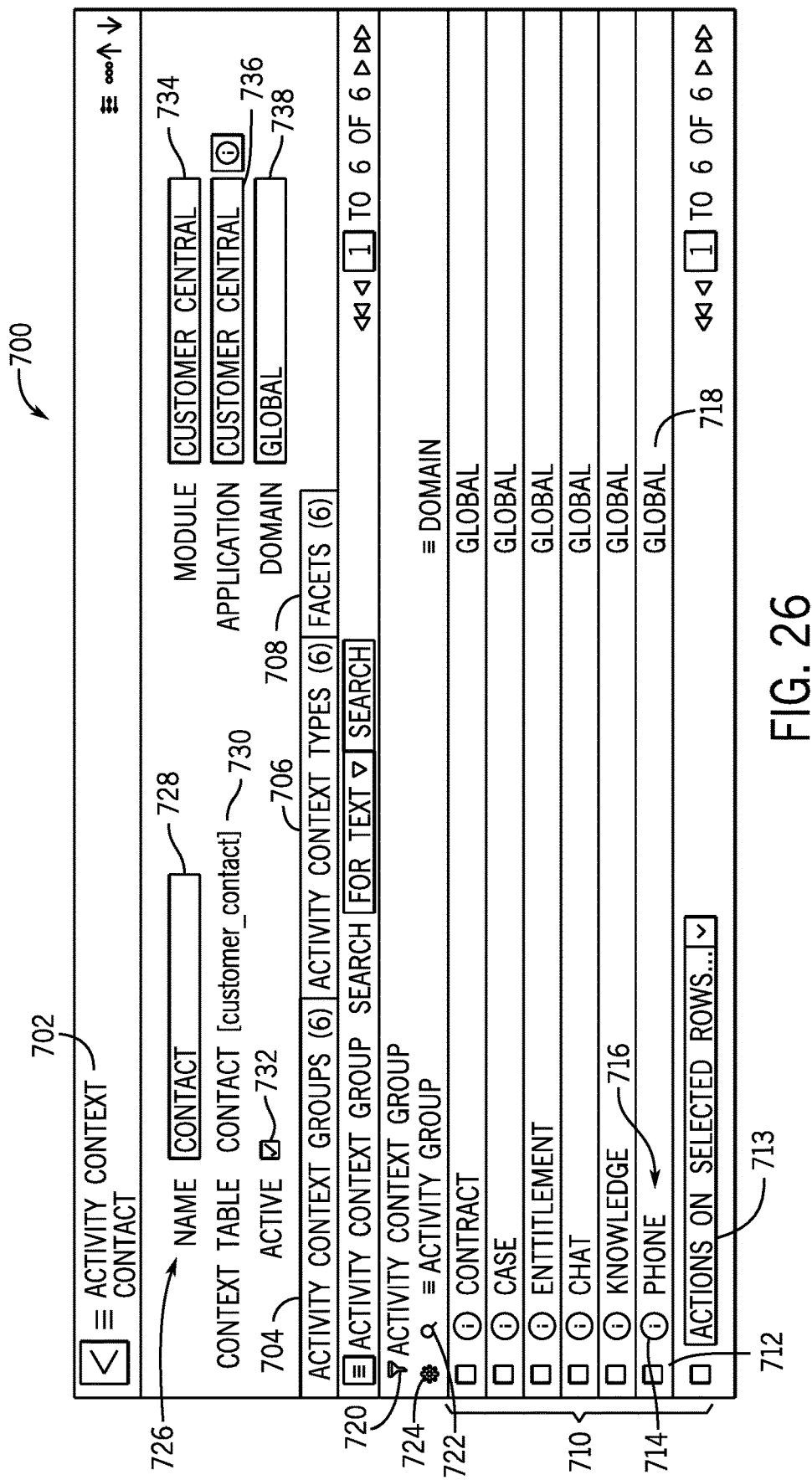
FIG. 26 is a graphical user interface (GUI) used to configure the customer activity page by selecting an activity context group tab, in accordance with aspects of the present disclosure.

As previously discussed, the GUI 250 may be configurable by an administrator. For example, a backend administrator for the cloud-based platform 16. FIG. 26 shows a GUI 700 that may be used to configure aspects of the GUI 250. As illustrated, the GUI 700 includes a title 702 that indicates that a context (e.g., activity contact) being edited. The GUI 700 also includes an activity context groups tab 704, an activity context types tab 706, and a facets tab 708. When the activity context groups tab 704 is selected, the GUI 700 presents a list of activity context group entries 710. The GU 700 enables editing of the activity context groups via selection of the activity context group entries 710. Each of the activity context group entries 710 has a radio 712 that may be selected. A dropdown menu 713 may be used to perform an action on the selected activity context group entries 710. The actions may include copying, moving, deleting, and/or other operations that may be performed on the activity context group entries 710. The GUI 700 also includes info buttons 714 that may be used to view a detailed view of information about a corresponding activity context group entry 710. Each of the activity context group entries 710 includes a descriptive title 716 and a domain 718 for the respective activity group context.

The activity context group entries 710 may be filtered using a filter button 720. The activity context group entries 710 may be searched using a search button 722. The GUI 700 also includes a settings button 724 that enables changing settings for the GUI 700 and/or the activity context group entries 710.

The GUI 700 includes a details pane 726 that may be used to view information about the context and/or a specific selected entry. The details in the details pane 726 may be populated upon selection of the info button 716 or the descriptive title 716. As illustrated, the details pane 726 includes a name field 728, a context table 730, an activity status 732, a module field 734, an application field 736, and a domain field 738. The name field 728 may be the descriptive title 716 of the selected entry. The context table 730 may indicate a table in the databases 26 of the cloud-based platform 16. The activity status 732 may be indicate and/or be used to toggle whether the respective activity group is active for the context indicated by the table in the context table 730. The module field 734 indicates a module for which the activity group applies. The application field 736 indicates an application for which the activity group applies. The domain field 738 may be the same information shown in the domain 718 for the activity context group entry 710.

Figure 27:
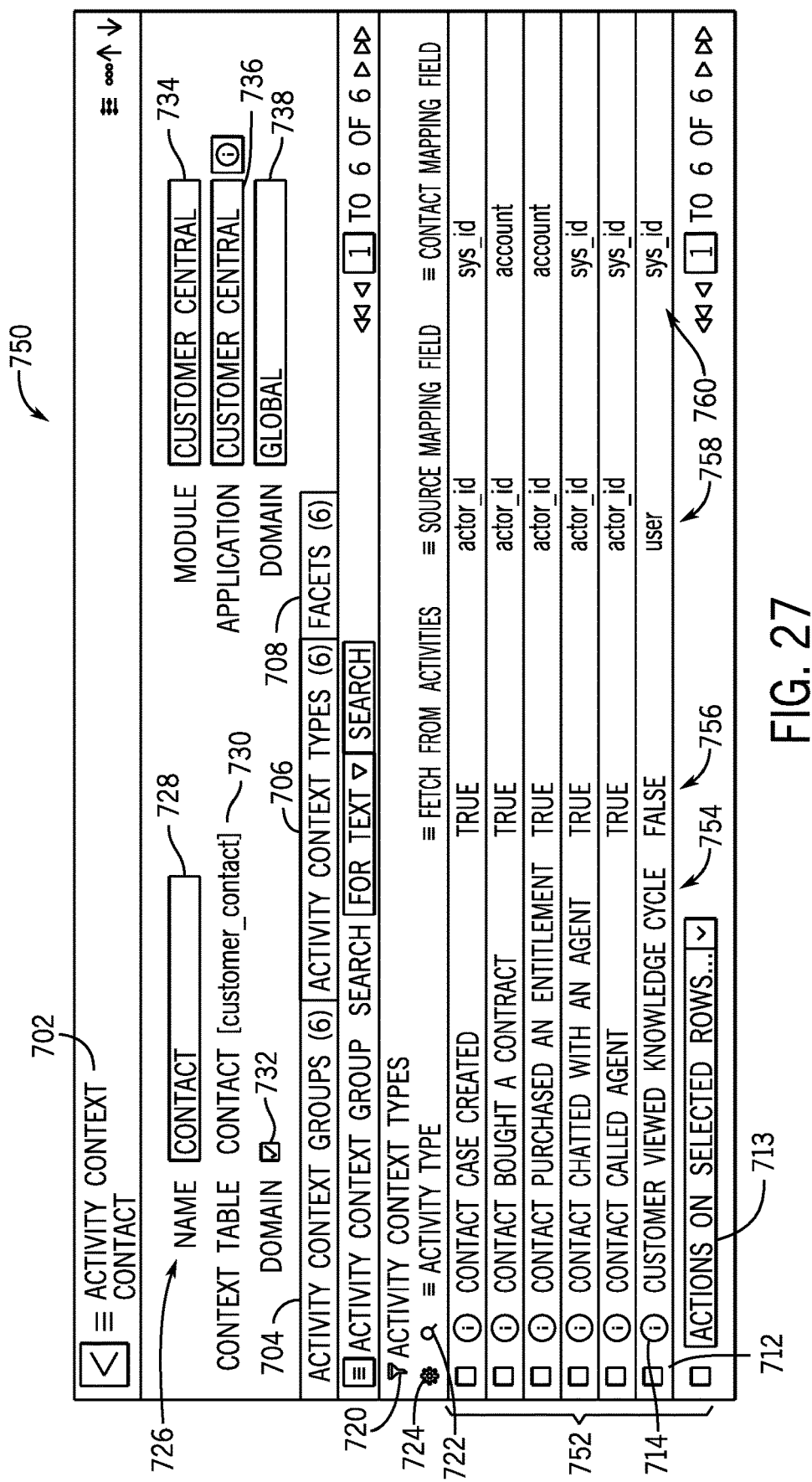
FIG. 27 is a graphical user interface (GUI) used to configure the customer activity page by selecting an activity context type tab, in accordance with aspects of the present disclosure.

As illustrated in FIG. 27, when the activity context types tab 706 is selected, a GUI 750 is presented. The GUI 750 is similar to the GUI 700 except that the GUI 750 includes a list of activity type entries 752 instead of the activity context group entries 710 of the GUI 700. Each of the activity type entries 752 include an activity type 754, a fetch-from-activities flag 756, a source mapping field 758, and a content mapping field 760. The activity type 754 indicates an activity type for the respective entry. The fetch-from-activities flag 756 indicates whether information for the respective entry is to be fetched from a corresponding activity. The source mapping field 758 indicating from where the respective entry information is sourced. The context mapping field 760 indicates from where the context information is mapped.

Figure 28:
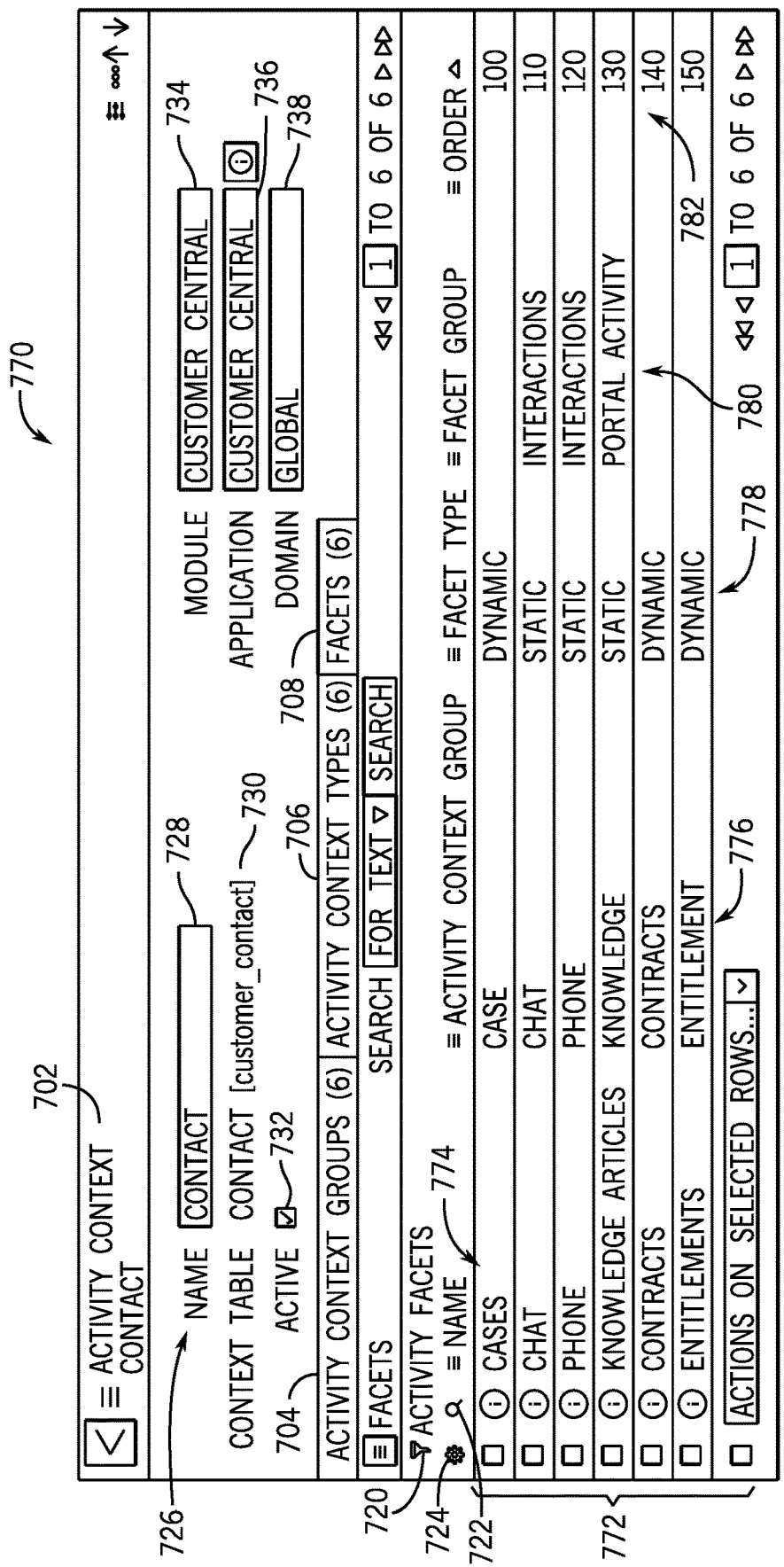
FIG. 28 is a graphical user interface (GUI) used to configure the customer activity page by selecting a facets tab, in accordance with aspects of the present disclosure.

As illustrated in FIG. 28, when the facet tab 708 is selected, a GUI 770 is presented. The GUI 770 is similar to the GUI 700 except that the GUI 770 includes a list of activity facet entries 772 instead of the activity context group entries 710 of the GUI 700. Each of the activity facet entries 772 each include a name 774, an activity context group 776, a facet type 778, a facet group 780, and an order 782. The name 774 specifies the specific facet entry. The activity context group 776 indicates a context group to which the corresponding facet belongs. The facet type 778 indicates whether the facet is static or dynamic. For instance, a static facet does not change, such as 369, 370, and 372 of FIG. 8, while changing the data in a dynamic facet causes the facet (e.g., facet 392 of FIG. 12) to be presented differently. The facet group 780 indicates a group to which the underlying facet belongs. The order 782 controls an order in which the facets are presented.

As illustrated in relation to FIG. 27 activity types for a selected context may be presented. Additionally or alternatively, a list of all activity types may be accessed by a backend administrator. For instance, GUI 790 displays a title 792 showing that activity types rather than only those for a particular context are presented. The GUI 790 also includes a list of activity type entries 794 that may be selected for inclusion in a display in the centralized UI for a particular context (e.g., a contact). As illustrated, each of the activity type entries 794 includes a short description 796, an activity source 798 for the activity type, an activity message 800 for the activity type, a verb 802 for the activity type, an actor 804 (e.g., contact, account, or consumer) for the activity type, an object 806 for the activity type, a target 808 for the activity type, and a module 810 for the activity type. Using the GUI 790, the activity types may be defined or created (e.g., via a new button 812) and used in the GUI 250. Each of the activity types represented in the list may be associated with an activity group and/or context.

Figure 30:
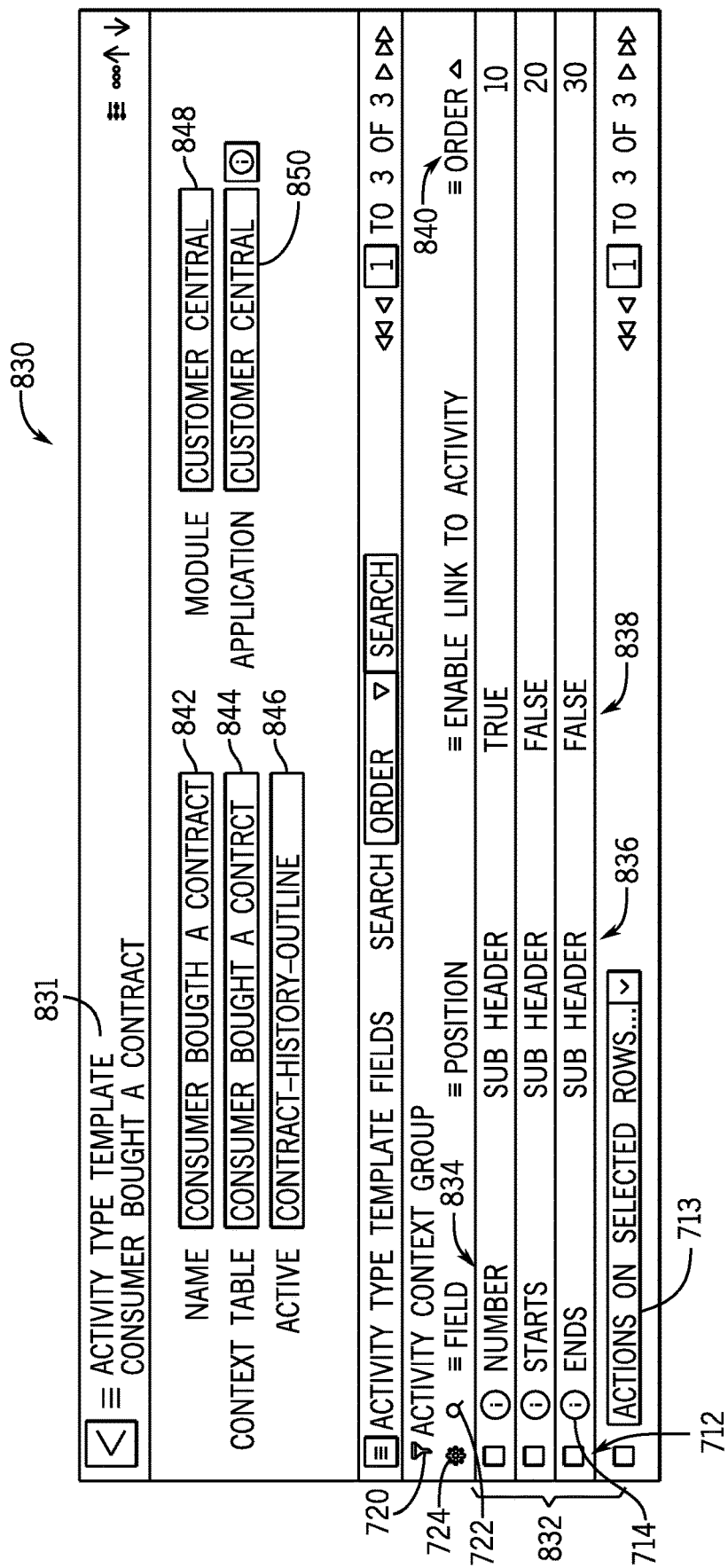
FIG. 30 is a graphical user interface (GUI) used to configure a details frame of the customer activity page by defining an activity type template, in accordance with aspects of the present disclosure.

FIG. 30 is an activity type template GUI 830. The activity type template GUI 830 includes a title that indicates that a particular activity type (e.g., Consumer bought a contract) that is being configured. The activity type template GUI 830 that may specify items of information 832 that may be used to define what is shown in the information in the details frame 256 (e.g., in corresponding activity cards). In other words, the activity type template GUI 830 may be used to define what is presented in the details frame 256 for particular activity types.

As illustrated, each item of information 832 of the activity type template GUI 830 includes a field 722, a position 836, an enable link to activity group record 838, and an order 840.

The field 722 may be used to name the field used to store the information and/or describe the information. The position 836 specifies and enables editing of where the information is to be displayed in the details frame 256. The enable link to activity group record 838 may enable the information presented in the details frame 256 to be linked to the activity group record. The order 840 specifies an order in which the items of information 832 are presented in the details frame 256.

The activity type template GUI 830 also includes a name 842 of the activity type being edited, an activity type 844 of the activity type being edited, and an icon 846 displayed with the activity type in the details frame 256. The activity type template GUI 830 also includes a module 848 for which the activity type is applicable, and the activity type template GUI 830 includes an application 850 for which the activity type is applicable.

Figure 29:
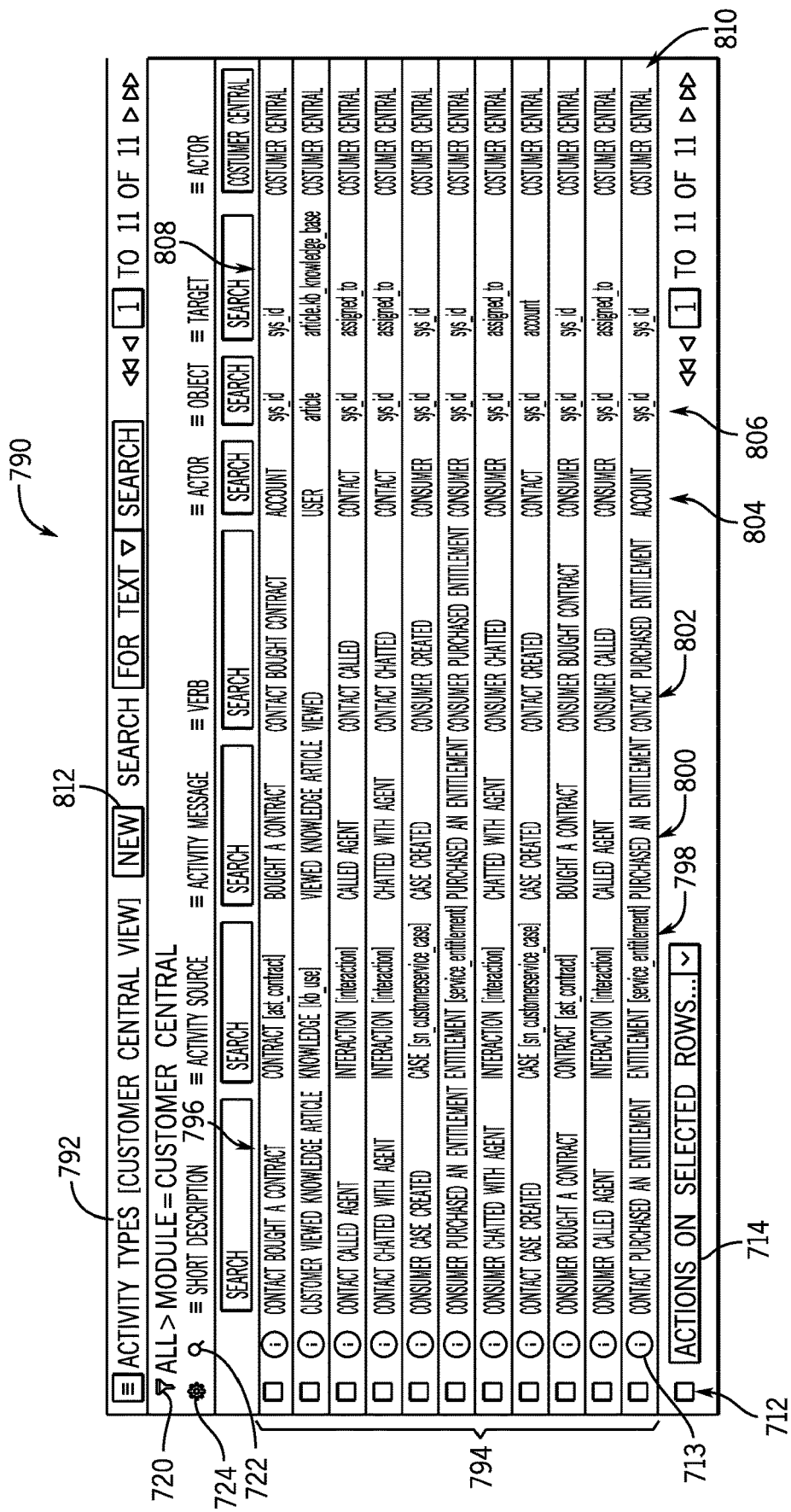
FIG. 29 is a graphical user interface (GUI) used to configure the customer activity page by defining activity types, in accordance with aspects of the present disclosure.
Figure 31:
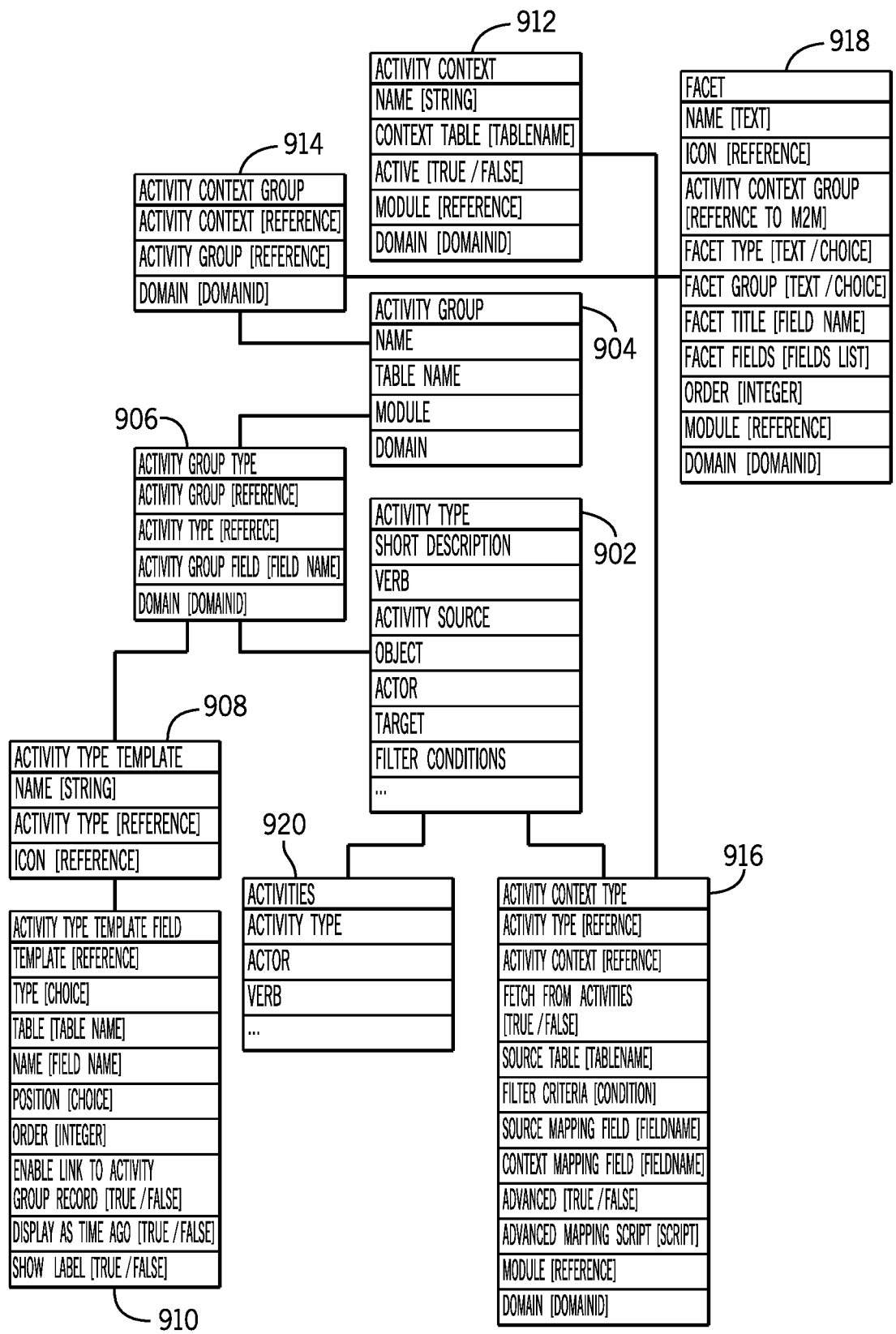
FIG. 31 is a graphical diagram of a schema that may be used to implement the GUIS of FIGS. 4 and 5, in accordance with aspects of the present disclosure.

A schema may be used to implement the various GUI items disclosed herein. For instance, FIG. 31 represents an embodiment of a schema 900 that may be used to implement the foregoing interfaces. As illustrated, the schema 900 includes an activity type 902. The activity type 902 is an action that a contact or consumer performs. These actions are displayed in the activity feed on the customer activity tab. The schema 900 also includes an activity group 904. An activity group 904 is a logical grouping of activity types 902. An activity group 904 is displayed in the activity feed based on the facet selected. The schema 900 further includes an activity group type 906. The activity group type 906 associates activity types 902 to an activity group 904. The schema 900 also includes an activity type template 908 and an activity type template field 910. The activity type template 908 and the activity type template field 910 configure an activity type template 908 & activity type template fields 910 to define how to display the activity type 902 data on each of the activity tiles in the activity feed in a corresponding GUI. The activity type template 908 and the activity type template field 910 can define which fields are displayed, where it is displayed on the tile, and the order of the display as discussed in relation to FIG. 29.

The schema 900 includes an activity context 912. An activity context 912 entity defines the context under which all activities 920 are captured. The activity context 912 provides a filter on the activities for the agent to view on the customer activity feed. For example, the filer may include two predefined activity contexts: consumer and contact. Another context may include a customer account that may filter all the activities under the account context.

The schema 900 includes an activity context group 914 that associates an activity group 904 into an activity context 912. An activity context type 916 associates activity types 902 to an activity context 912. The schema 900 also includes a facet 918 that groups data, which enables customer service agents to filter and display desired data. Each facet 918 represents an activity group 904. The activities 920 includes a transaction table that stores the activities that occur in tables configured in activity types 902.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving an indication that a user has initiated an interaction with a cloud platform for support;
creating an interaction record for the interaction;
determining a context for the interaction;
presenting a graphical user interface (GUI) to display information based on the context, wherein presenting the GUI comprises displaying a first subset of sub-frames of the GUI while suppressing a second subset of sub-frames of the GUI, wherein the first subset of sub-frames are related to information about previous interactions with the cloud platform relevant to the context;
receiving an indication of an ending of the interaction;
presenting a wrap-up with confirmation indicators representative of one or more actions taken with respect to one or more records during the interaction via the GUI, and wherein the one or more actions resolve an issue that prompted the interaction;
receiving an indication that one or more of the confirmation indicators is correct; and
in response to receiving the indication that the one or more of the confirmation indicators is correct, editing the one or more records to include one or more indications of the one or more actions taken with respect to the one or more records during the interaction.

2. The method of claim 1, comprising receiving an indication that an agent has accepted the interaction, wherein the indication that the user has initiated the interaction comprises receiving a phone call from the user at a call center, and creating the interaction record is based at least in part on the indication that the agent has accepted the interaction.

3. The method of claim 1, comprising receiving an indication that an agent has accepted the interaction, wherein the indication that the user has initiated the interaction comprises receiving a chat message from the user, and creating the interaction record is based at least in part on the indication that the agent has accepted the interaction.

4. The method of claim 1, comprising receiving an indication that an agent has accepted the interaction, wherein the indication that the user has initiated the interaction comprises receiving an short message service (SMS) message from the user, and creating the interaction record is based at least in part on the indication that the agent has accepted the interaction.

5. The method of claim 4, wherein the SMS message is part of an ongoing SMS interaction with the user.

6. The method of claim 5, wherein the ongoing SMS interaction is between the user and a virtual agent.

7. The method of claim 5, wherein the ongoing SMS interaction is between the user and another agent.

8. The method of claim 4, comprising creating an escalation record, wherein the SMS message includes an escalate code to escalate the interaction, and creating the escalation record is based at least in part on the escalate code.

9. The method of claim 1, wherein the context comprises an account context, wherein the previous interactions with the cloud platform comprise previous interactions between contacts for an account, wherein the contacts for the account comprise the user.

10. The method of claim 1, wherein the context comprises a contact context, wherein the previous interactions with the cloud platform comprise previous interactions between the user associated with an account while suppressing other interactions from other contacts associated with the account.

11. The method of claim 1, wherein the previous interactions comprise previous searches in a portal of the cloud platform or knowledge articles read by the user via the cloud platform.

12. A tangible, non-transitory, and computer-readable medium having stored thereon instructions, that when executed by one or more processors, are configured to cause the one or more processors to:
present, via an electronic display, a graphical user interface (GUI) configured to:
request an agent to accept an interaction having a first interaction type of a plurality of interaction types selected based on a context of the interaction;
receive an indication of acceptance that the interaction from the agent;
based at least in part on the indication of acceptance, present indications of previous interactions of the plurality of interaction types; and
present a wrap-up page with one or more confirmation indicators representative of one or more actions taken with respect to each record of one or more records via the GUI during the interaction based at least in part on an indication that the interaction is ending or has ended, wherein the one or more actions resolve an issue that prompted the interaction; and
in response to receiving an indication that the one or more confirmation indicators are correct, edit the one or more records to include one or more indications of the one or more actions taken with respect to each record of the one or more records during the interaction.

13. The tangible, non-transitory, and computer-readable medium of claim 12, wherein presenting the GUI comprises presenting a view as a button configured to switch contexts for the GUI from an account context to a contact context or from the contact context to the account context.

14. The tangible, non-transitory, and computer-readable medium of claim 12, wherein presenting the GUI comprises presenting a customer activity tab that when selected is configured to present a customer activity page.

15. The tangible, non-transitory, and computer-readable medium of claim 14, wherein the customer activity page comprises a plurality of selectable facets corresponding to the plurality of interaction types, that when selected via the GUI, are configured to cause a sub-frame of the customer activity page to display information corresponding to the plurality of selectable facets.

16. The tangible, non-transitory, and computer-readable medium of claim 15, wherein the plurality of selectable facets comprises products sold to a customer, services purchased by the customer, installed products or services, contracts, portal searches performed by a user associated with the interaction or an associated account, and knowledge articles reviewed by the user or the associated account.

17. The tangible, non-transitory, and computer-readable medium of claim 12, wherein the instructions, when executed by the one or more processors, are configured to cause the one or more processors to:
perform a lookup of a contact used in initiating the interaction; and
verify the contact.

18. The tangible, non-transitory, and computer-readable medium of claim 17, wherein verifying the contact comprises utilizing two-factor authentication for the contact.

19. The tangible, non-transitory, and computer-readable medium of claim 12, wherein editing the one or more records comprises editing records in a configuration management database (CMDB), an accounts database, a browsing history database, an interaction records database, a contracts database, or an entitlements database.

20. A system, comprising:
one or more processors; and
a memory storing instructions, that when executed by the one or more processors, are configured to cause the one or more processors to:
receive a request to initiate an interaction from a contact via a telephone call, a chat message, or a short message service (SMS) message;
request an agent to accept the interaction;
receive an indication of acceptance that the interaction has been accepted from the agent;
based at least in part on the indication of acceptance, present, via a graphical user interface (GUI), indications of previous interactions of with the contact or an affiliated account, wherein the previous interactions comprise previous searches by the contact or the affiliated account or knowledge articles reviewed by the contact or the affiliated account;
receive one or more inputs from the agent via the GUI, wherein the one or more inputs are representative of one or more actions taken with respect to one or more records during the interaction that resolve an issue that prompted the interaction; and
edit the one or more records to include one or more indications of the one or more actions taken with respect to the one or more records during the interaction.

* * * * *

UNITED STATES PATENT AND TRADEMARK OFFICE
CERTIFICATE OF CORRECTION

| | | |
|---|---|---|
| PATENT NO. | : 12,015,739 B2 | Page 1 of 1 |
| APPLICATION NO. | : 17/020606 | |
| DATED | : June 18, 2024 | |
| INVENTOR(S) | : Umakanth Godavarthy et al. | |

It is certified that error appears in the above-identified patent and that said Letters Patent is hereby corrected as shown below:

In the Claims

Column 24, Line 54, Claim 4, please replace "an" with --a--.

Column 25, Line 25, Claim 12, please replace "that" with --of--.

Column 26, Line 39, Claim 20, please delete the second occurrence of the word "of".

Signed and Sealed this
Twenty-fourth Day of September, 2024

Katherine Kelly Vidal
*Director of the United States Patent and Trademark Office*